(12) United States Patent
Gerber et al.

(10) Patent No.: US 10,131,048 B2
(45) Date of Patent: Nov. 20, 2018

(54) CONNECTION DEVICE AND DRIVE ASSEMBLY FOR A CUTTING TOOL

(71) Applicant: John Bruce Gerber, Seven Hills, New South Wales (AU)

(72) Inventors: John Bruce Howard Gerber, Seven Hills (AU); David Eugene Gerber, Newtown (AU); Lee Blattmann, Castle Cove (AU)

(73) Assignee: JOHN BRUCE HOWARD GERBER, Seven Hills, New South Wales (AU)

( * ) Notice: Subject to any disclaimer, the term of this patent is extended or adjusted under 35 U.S.C. 154(b) by 77 days.

(21) Appl. No.: 15/113,103

(22) PCT Filed: Jan. 9, 2015

(86) PCT No.: PCT/AU2015/050003
§ 371 (c)(1),
(2) Date: Jul. 21, 2016

(87) PCT Pub. No.: WO2015/109369
PCT Pub. Date: Jul. 30, 2015

(65) Prior Publication Data
US 2017/0021488 A1    Jan. 26, 2017

(30) Foreign Application Priority Data
Jan. 22, 2014   (AU) ................................ 2014200377

(51) Int. Cl.
*B25F 3/00* (2006.01)
*B23D 29/00* (2006.01)
*B26B 15/00* (2006.01)

(52) U.S. Cl.
CPC .............. *B25F 3/00* (2013.01); *B23D 29/005* (2013.01); *B26B 15/00* (2013.01)

(58) Field of Classification Search
CPC .......... B25F 3/00; B23D 29/005; B26B 15/00
(Continued)

(56) References Cited

U.S. PATENT DOCUMENTS

| 111,152 | A | * | 1/1871 | Smith | F16B 7/0426 |
| | | | | | 403/312 |
| 1,559,546 | A | * | 11/1925 | Bosket | F16D 1/04 |
| | | | | | 403/312 |

(Continued)

FOREIGN PATENT DOCUMENTS

| AU | 2003203894 A1 | 11/2004 |
| WO | WO 2015/109369 A1 * | 7/2015 |

*Primary Examiner* — Hwei C Payer
(74) *Attorney, Agent, or Firm* — Whitham & Cook, P.C.

(57) ABSTRACT

The present invention provides a connection device or tool (10, 110, 210, 310, 410, 510, 610, 1110, 2110, 3110, 4110) to connect a first tool (80, 90) to a second tool (90,80), the connection device or tool (10, 110, 210, 310, 410, 510, 610, 1110, 2110, 3110, 4110) comprising at least one shell member 30 which clamps a first end to said first tool (80, 90) and a second end of said at least one shell member 30 to engage with said second tool (90,80), whereby relative rotation between said first tool and second tool is prevented, and axial separation of said first tool (80, 90) and second tool (90,80) is prevented or is assisted in being prevented. This results in a safer combination of the first tool (80, 90) and second tool (90,80), and allows for a one handed operation of the combination.

18 Claims, 19 Drawing Sheets

(58) Field of Classification Search
USPC .......................................................... 30/500
See application file for complete search history.

(56) References Cited

U.S. PATENT DOCUMENTS

| | | | |
|---|---|---|---|
| 2,256,779 A | | 9/1941 | Mchenry |
| 2,635,335 A | | 4/1953 | James |
| 2,760,265 A | | 8/1956 | Draenert |
| 2,840,904 A | | 7/1958 | Hutchins |
| 2,881,519 A | * | 4/1959 | Gardner .................. A01G 3/08 30/122 |
| 4,122,601 A | | 10/1978 | Katsuya |
| 4,312,610 A | * | 1/1982 | Burt ....................... B23D 27/04 29/26 B |
| 4,317,282 A | | 3/1982 | Pace |
| 4,397,088 A | * | 8/1983 | Hampel ................. A01D 34/90 285/419 |
| 4,463,498 A | | 8/1984 | Everts |
| 4,505,040 A | | 3/1985 | Everts |
| 4,733,471 A | * | 3/1988 | Rahe ..................... A01D 34/90 30/276 |
| 5,371,947 A | | 12/1994 | Dickey |
| 5,445,480 A | | 8/1995 | Merriman |
| 5,802,724 A | | 9/1998 | Rickard et al. |
| 5,926,961 A | | 7/1999 | Uhl |
| 6,089,331 A | | 7/2000 | Christ |
| 6,264,211 B1 | | 7/2001 | Granado |
| 2007/0095792 A1 | * | 5/2007 | Kremsler ............... A01D 34/90 218/14 |
| 2011/0219626 A1 | | 9/2011 | Broeker et al. |
| 2017/0021488 A1 | * | 1/2017 | Gerber ................. B23D 29/005 |

\* cited by examiner

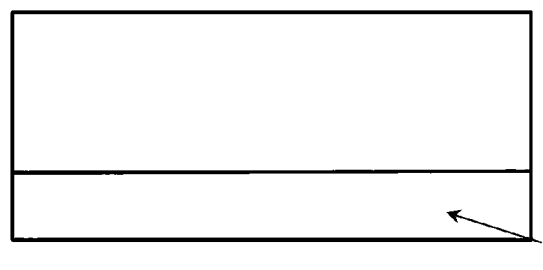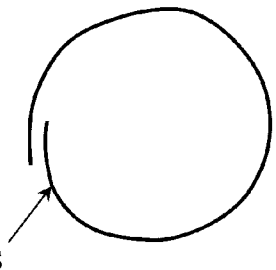
Figure 28  Figure 29
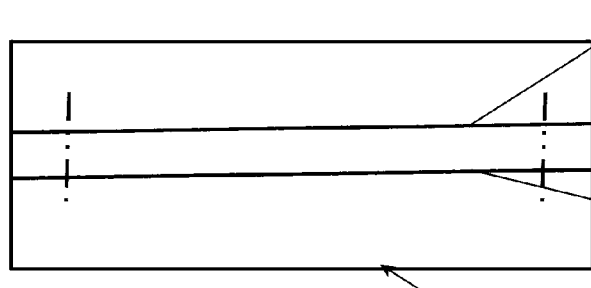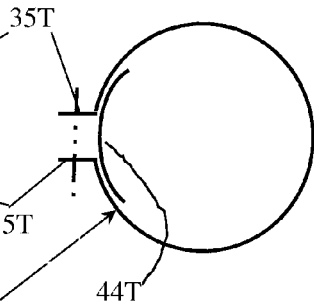
Figure 30  Figure 31
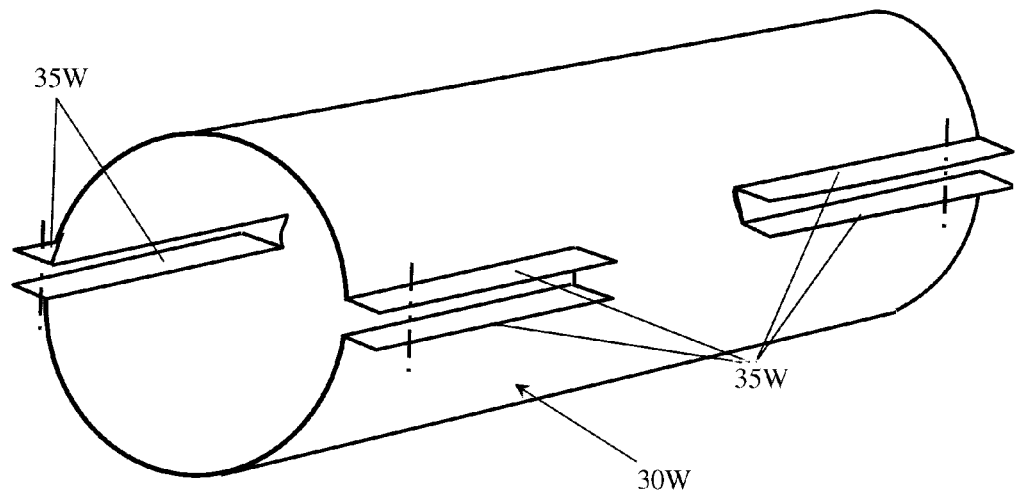
Figure 32

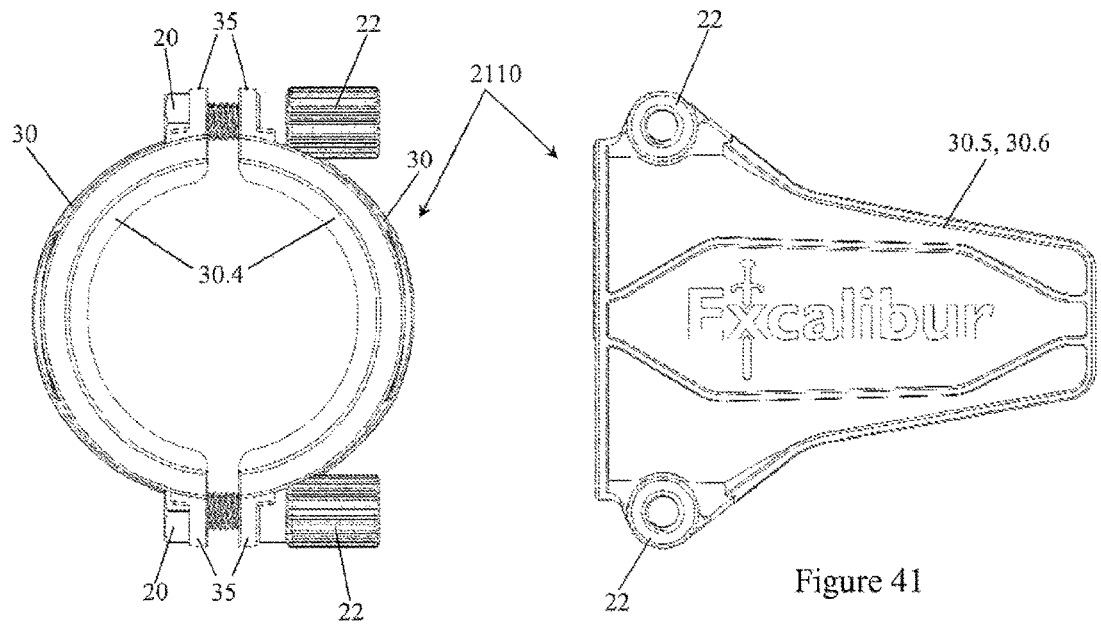
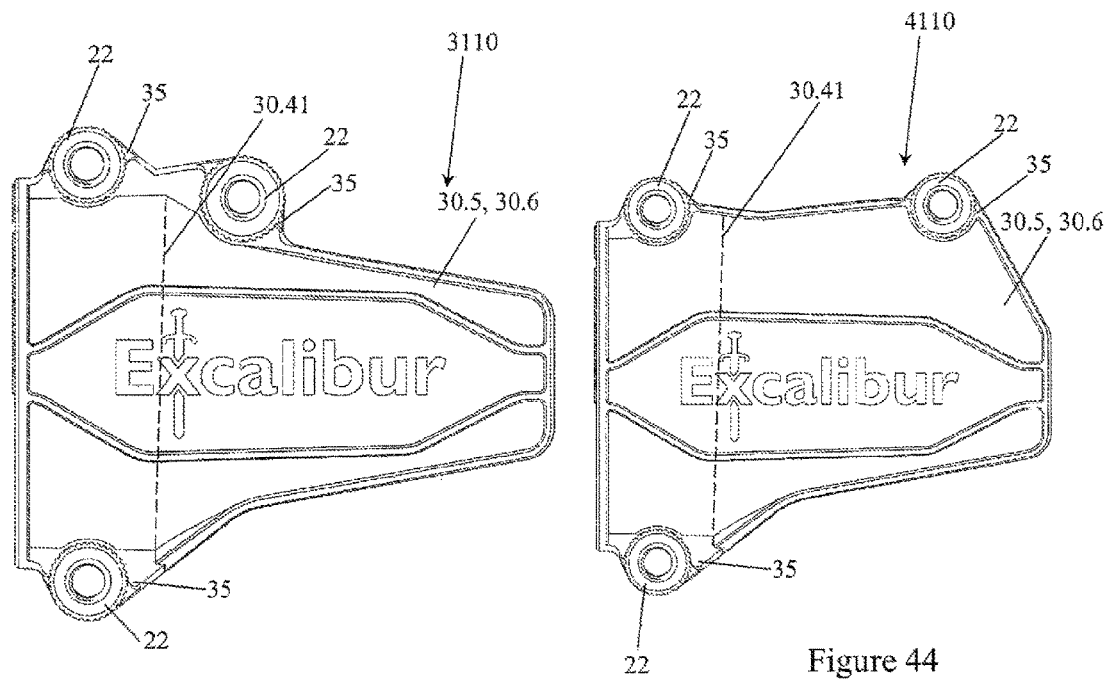

CONNECTION DEVICE AND DRIVE ASSEMBLY FOR A CUTTING TOOL

FIELD OF THE INVENTION

The present invention relates to a connection device or tool to connect a drill or driver to an oscillation driven cutting tool, as well as a cutting tool's drive assembly.

BACKGROUND OF THE INVENTION

Oscillation driven cutting tools are well known, and an example of such tools are disclosed in Australian patent 568869 or applications 2007201570 and 2007201571, each of which is incorporated herein by reference, as to the construction and features of the cutting tools.

Several difficulties are faced with such cutting tools, in that such cutting tools are meant to be secured to a drill and there remain until used by an operator. This means that operators had to have several drill units including a single purpose drill for a cutting shear, and if a board cutter and a metal shear were needed, then the operator had two single purpose drills.

Any reference herein to known prior art does not, unless the contrary indication appears, constitute an admission that such prior art is commonly known by those skilled in the art to which the invention relates, at the priority date of this application.

SUMMARY OF THE INVENTION

The present invention provides a connection tool or device to connect a first tool to a second tool, the connection tool or device comprising at least one first shell member which has at least a first end which is securable and or includes portions moveable with respect to each other, so as to clamp a first end of the at least one first shell member to the first tool and a second end of the at least one first shell member being adapted to interact or cooperate with the second tool.

The second end can interact or cooperate with the second tool by rotation therebetween being prevented.

Rotation can be prevented by the second end engaging a portion of the second tool.

Rotation can be prevented by the second end being clamped to a portion of the second tool.

The second end can interacts or cooperates with said second tool by preventing or assisting to prevent said first tool relatively axially separating from said second tool.

At least first and second shell members are utilised which can be securable and moveable towards each other so as to: clamp a first end of the shell members to the first tool and to clamp a second end of the shell members to the second tool; or clamp a first end of the shell members to the first tool whereby the second end of said shell members will prevent rotation between said second end and said second tool.

The connection tool or device can include at least one first skirt member extending from at least the first shell member.

The at least one first skirt member can extend from the first shell member underlies and or overlies part of the second shell member.

The at least one first skirt member can be clamped between the second shell member and one of the tools when the connection tool or device is assembled and clamped to the tools.

The at least one first skirt member can extend along all of, or parts of, or part the length of the first shell member.

The second shell member can include at least one second skirt member extending from the second shell member, so that the at least one second skirt member will be clamped between the first shell member and one of the tools when the connection tool or device is assembled and clamped to the tools.

The at least one second skirt member can extend along all of, or parts of, or part of, the length of the second shell member.

The second shell member can include a flange or a shoulder so as to engage an extremity of the first skirt member to thereby prevent the first skirt member moving past a predetermined location with respect to the second shell member.

The first shell member can include a flange or a shoulder so as to engage an extremity of the second skirt member to thereby prevent the second skirt member moving past a predetermined location with respect to the first shell member.

At least one the skirt member or at least one shell member can include a friction generating material on an inner surface so as to increase the friction developed with the first and or the second tool when the connection tool or device is assembled or clamped to the first tool and or the second tool.

The shell members can have a generally half cylindrical construction.

The shell members can have at least one flange located on an outer periphery thereof by which securing means to clamp the shell members together onto the first tool and or the second tool.

The first and second shell members can be generally half cylindrical and the first end has a first diametrical measurement while the second end has a different diametrical measurement.

A substantial portion of the axial length of the shell members can have the first diametrical measurement.

Between the first and second diametrical measurements can be a tapering or conical portion.

The connection tool or device can be used in one or more than one of the following situations: with a first tool having a cylindrical neck or collar of a diameter which is greater than a cylindrical neck or collar of the second tool; with a first tool having a cylindrical neck or collar of a diameter which is less than a cylindrical neck or collar of the second tool; with a first tool having a cylindrical neck or collar of a diameter which is substantially equal to a cylindrical neck or collar of the second tool.

The first and or second skirt member act as a shield by closing off, or partially closing off, a space between the first and second shell members.

At an intermediate location on the first and or the second shell members there can be located an axially extending circumferentially located channel or recess.

The channel or recess can be able to accommodate the radial oscillations of a part of a cutting tool.

The first and second shell members can be identical in construction.

The shell member can be a single shell member which has free sides which are able to move towards each other.

The sides can include one or more flanges to secure the sides of the connection tool or device together to clamp to the first and or second tool.

A shield or skirt member can be associated with the shell.

The shield or skirt member can be attached to one side of the shell.

The shield or skirt member can be not attached to the shell prior to assembly with a first and or second tool.

The shield or skirt member has central cylindrical portion and at each end thereof, are sides which are able to move towards each other so as to clamp the first and or second tool.

The shell members and or the skirt member can include one or more of the following features: manufactured from any appropriate material which will be conformable in use including metal or polymeric material; manufactured from poly propylene or polycarbonate; have their portions no more than 1.5 to 2 mm in thickness; have a recessed area allowing for the application of branding to the shell members; the shell members are of approximately 110 to 150 mm in axial length; accommodate a diameter of a tool in the range of 40 to 55 mm at one end; accommodate a diameter of a tool in the range of 45 to 70 mm at one end; interact with a drill having chuck and an oscillation driven cutting tool which is held or secured to the chuck before the connection device is assembled to the drill and cutting tool.

The shell can have a generally cylindrical forward end.

The shell can have a bifurcated end to interact or cooperate with second tool.

The shell can have rearward extending wings which will interact or cooperate with the second tool.

The wings can have a curved construction.

The wings can have a shape which tapers in a front to rear direction.

The periphery of the wings can include a reinforcing flange.

An inner rim of the shell can include a flange or shoulder to control depth of insertion of a tool received by the first or second connection tool into the connection tool or device.

The flange or shoulder can extends partially around the inner rim.

The rearward end of the connection tool or device can include a bight which allows vision through the shell.

The device or tool can include a screw compression mechanism provided intermediate its ends so that said device or tool can apply pressure or force to the second tool or said first tool.

The first tool can be a rotary motion power tool such as a drill or screw driver or impact driver and the second tool can be a cutting device to be powered by the rotary motion power tool.

The second tool can be a rotary motion power tool such as a drill or screw driver or impact driver and the first tool can be a cutting device to be powered by the rotary motion power tool.

The present invention also provides a drive assembly for assembly to the body of an oscillation driven cutting tool, the drive assembly including a drive shaft having an first end with a drive formation, and a second end having an eccentric shaft member to produce oscillation of a moving blade of a cutting tool, intermediate the drive formation and the eccentric shaft member there is located a drive bearing surface to receive a drive bearing whereby the drive shaft also including a bearing surface for a bearing means on the eccentric shaft member, wherein the drive bearing includes an outer surface which is one or more than one of the following: the outer surface includes a circumferential groove or a recess on the circumference so that the drive bearing can be held in a cavity of the body of the oscillation driven cutting tool; the outer surface is shaped so as to be received into a cylindrical cavity of a collar member which includes a circumferential groove or a recess on the circumference so that the drive bearing can be held in a cavity the body of the oscillation driven cutting tool.

The assembly can include one or more than one of the following features: the drive formation is a hexagonal shaft; the drive formation is hexagonal and includes a peripheral groove at a location spaced from its free end; the bearing means is one of a roller bearing; ball bearing; thrust bearing; secured to the body of the cutting tool by means of grub screws or machine screws; secured to the body by means of screws which are pointed or rounded; the assembly uses bearing which are sealed and require no lubrication during their service life.

BRIEF DESCRIPTION OF THE DRAWINGS

A detailed description of a preferred embodiment and other embodiments will follow, by way of example only, with reference to the accompanying figures of the drawings, in which:

FIG. 28 illustrates a schematic side view of a single piece connector tool;

FIG. 29 illustrates a schematic elevation of the connector tool of FIG. 28;

FIG. 30 illustrates a schematic side view of a second single piece connector tool:

FIG. 31 illustrates a schematic elevation of the connector tool of FIG. 30;

FIG. 32 illustrates a schematic perspective view of a third single piece connector tool;

FIG. 41 illustrates a side view of a connection tool or device similar to that of FIGS. 34 to 40, except it is constructed of two halves and assembled with two screws;

FIG. 42 illustrates a front view of the connection device or tool of FIG. 41;

FIG. 43 illustrates a connection device or tool similar to FIGS. 41 and 42 except that a third screw is utilised; and FIG. 44 illustrates a connection device or tool similar to FIG. 43, with a third screw in a different location.

DETAILED DESCRIPTION OF THE EMBODIMENT OR EMBODIMENTS

Figure 1:
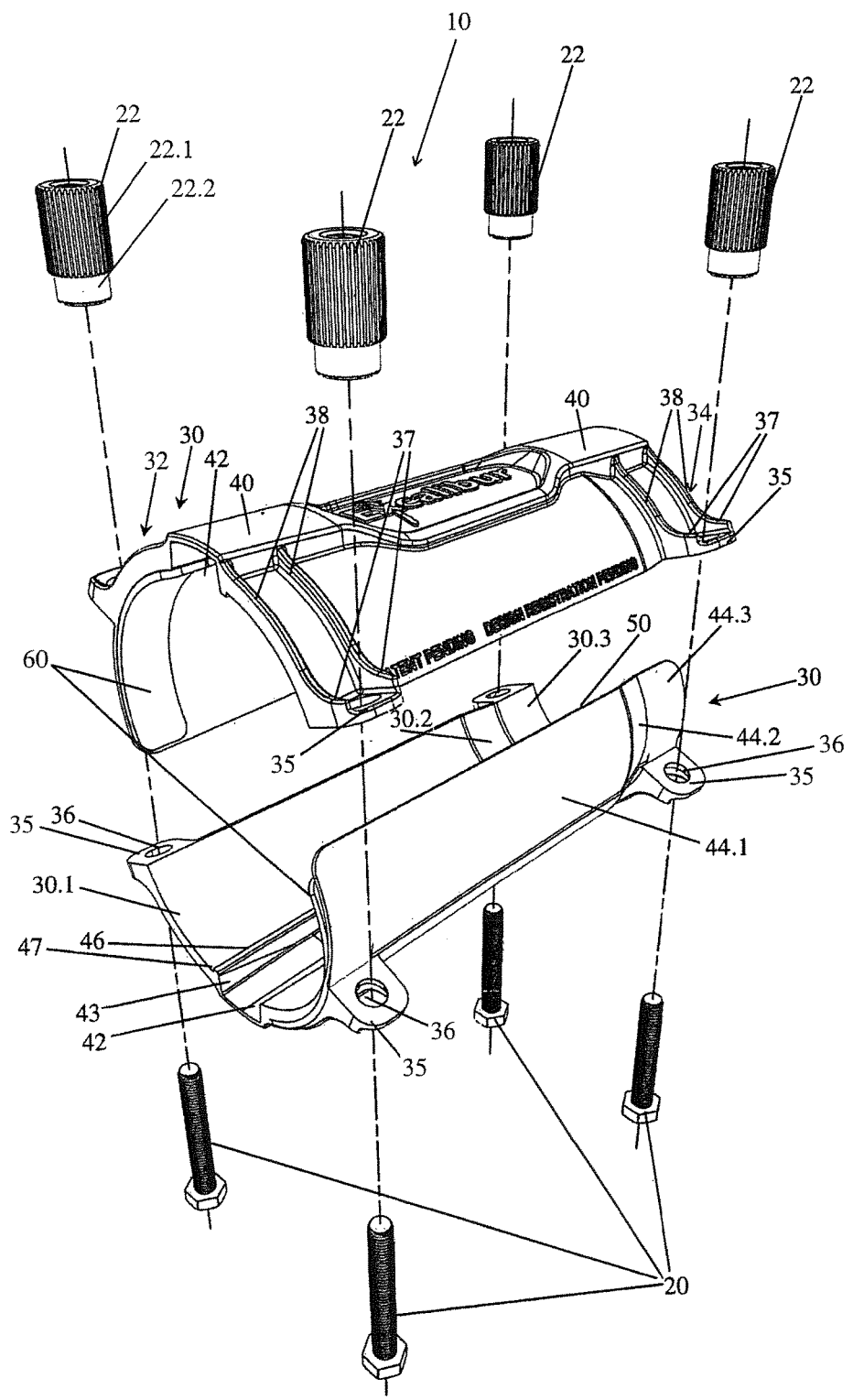
FIG. 1 is an exploded perspective view of a connection device or tool showing how the tools components are assembled.
Figure 2:
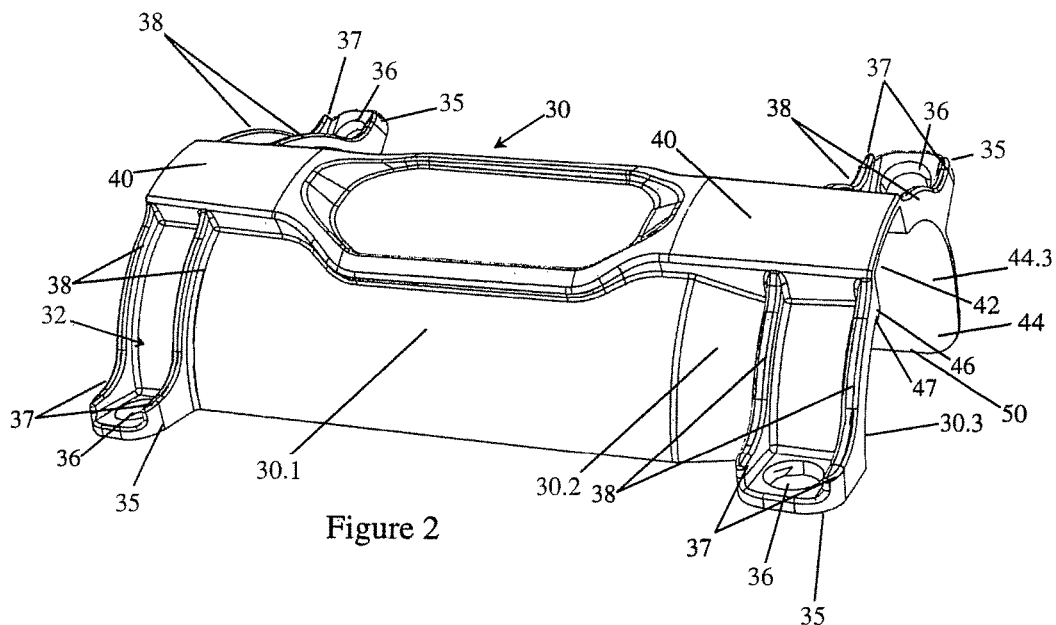
FIG. 2 illustrates a perspective view of one of the shell members of the device of FIG. 1.
Figure 4:
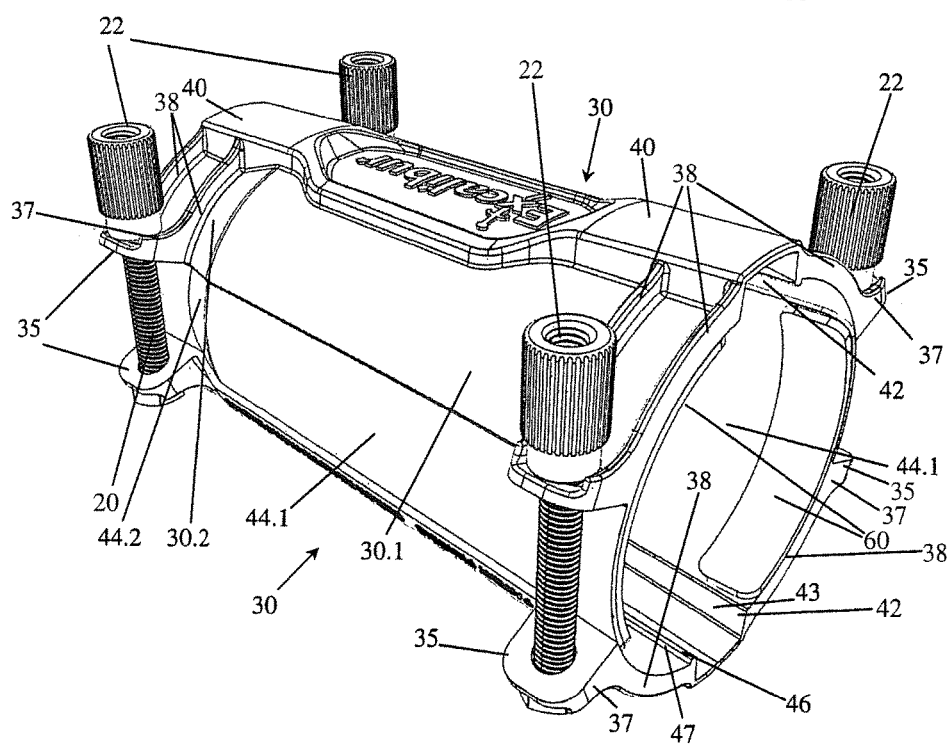
FIG. 4 is a rear perspective view of the device of FIG. 3.
Figure 3:
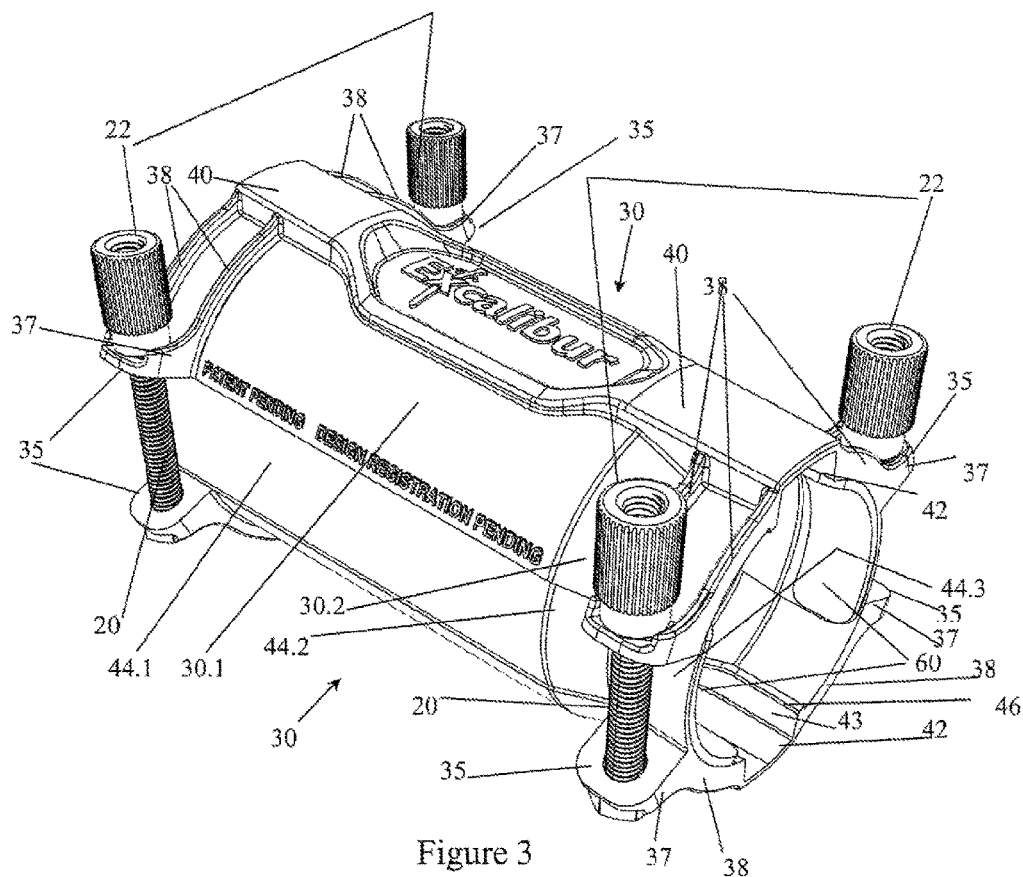
FIG. 3 is a front perspective view of an assembled device of FIG. 1.
Figure 9:
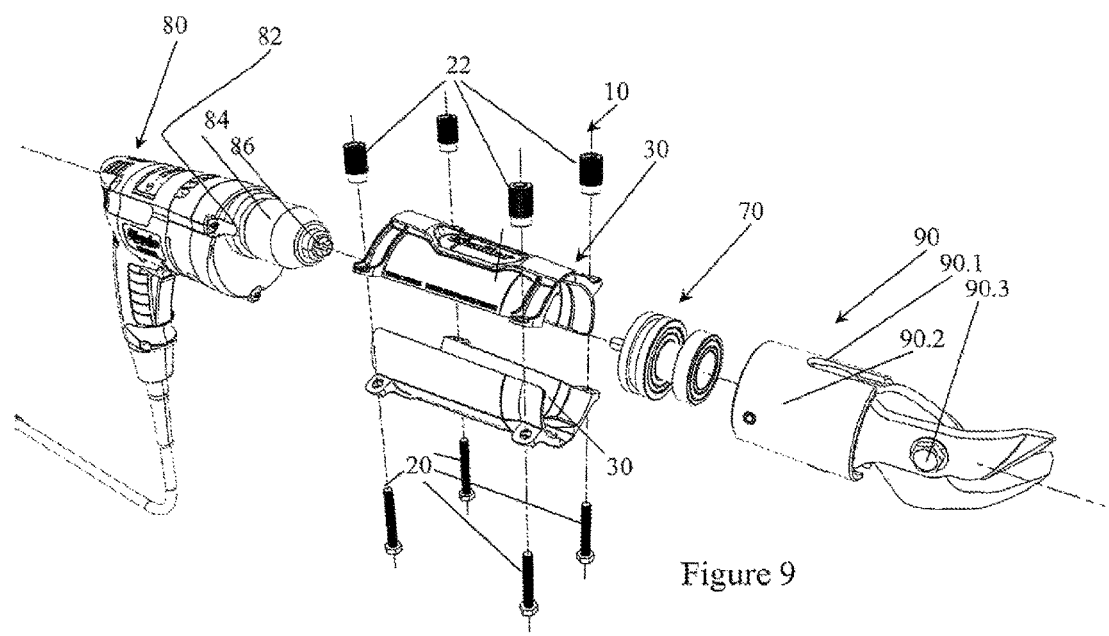
FIG. 9 is a front exploded perspective view showing the device of previous figures and an attachment arrangement to connect a drill with an oscillation driven cutting tool.

As is illustrated in FIGS. 1, 3 and 4, a connection device or tool 10 has an upper shell member 30 and a lower shell member 30 which are secured together by four machine screws 20 of approximately 50 mm or 35 mm in length (depending on the drill type) and knurled or splined nuts 22. The preferred embodiment has the shells 30 being identical "halves" as indicated in FIG. 2. Each shell 30 has a big end securing flange 32 at the "big end", and a small end securing flange 34 at the "small end". The securing flanges 32 and 34 each have a radially extending portion or flange 35 through which an aperture 36 is provided so that the shank of the screws 20 can pass through. Flanges 32 and 34 each include an inboard and outboard circumferential rib 38, each of which terminates in a radial rib portion 37 which extends over the edges of the flanges 35, so that sufficient strength is accorded to the flanges 32, 34 and 35 when the nuts 22 are secured by hand tightening means when an assembly such as that of FIG. 9 is made. The ribs 37 and 38 help to transmit the securing forces from the tightening of the machine screw and nut 22, in a circumferential manner.

The shell members 30 are preferably injection moulded from a polypropylene material, or otherwise manufactured preferably also from polypropylene material. However, it will be readily understood that the shell members 30 can be manufactured from any material that is conformable in use, such as metals such as aluminium, stainless steel, spring steel, or polymeric materials such as polypropylene or other material which will be conformable in use.

Figure 17:
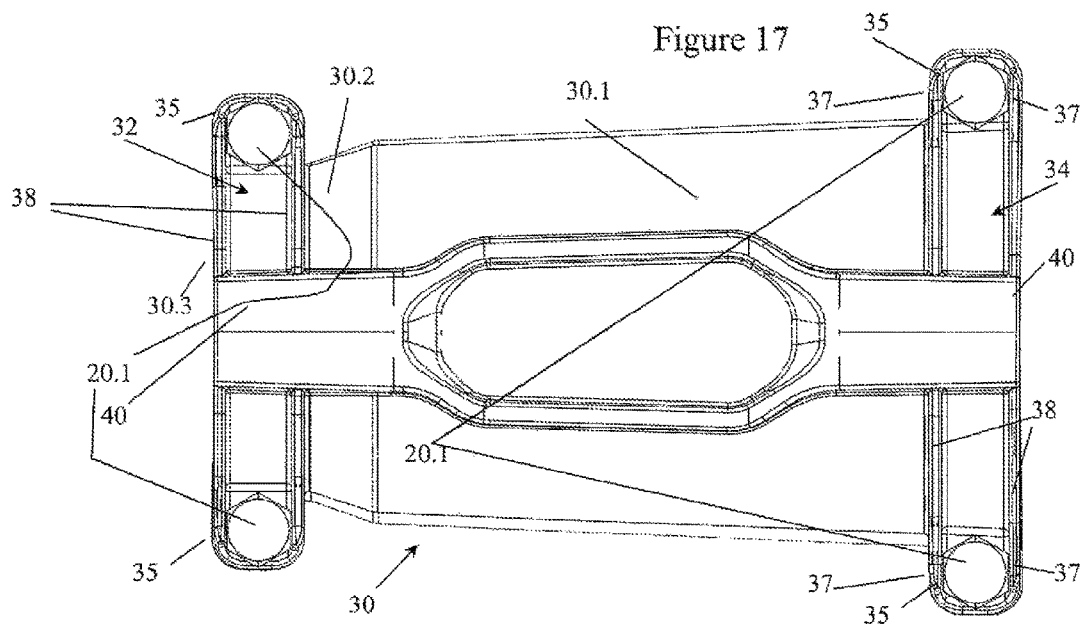
FIG. 17 illustrates an underneath view of the assembled device of FIG. 1.

The ribs 37 and 38 are approximately 2 mm in thickness and the space in between the ribs 37 on either side of the aperture 36 is spaced so that the distance between the ribs is equivalent approximately, to the across flats dimension of the hexagonal head of the machine screw 20 so that when the machine screw 20 hexagonal head is in between the ribs 37, as in FIG. 17, the hexagonal head will not rotate due to the ribs 37, as the nut 22 is being tightened thereon. It will be noted from FIG. 1 that the nut 22 has an outer end 22.1 which is knurled or splined, while the inner end 22.2 is cylindrical, and of a diameter to be able to rotate freely between opposed ribs 37. The axial length of inner end 22.2 is such that when the base of nut 22 is against flange 35, the lower rim of the outer knurled portion on outer end 22.1 will not contact the flanges 35. Further, as both shells 30 have the flanges 35, this will allow an operator to pass the bolts 20 in either direction. Thus in FIG. 1 the nuts 22 are located on top and the bolts 20 on the bottom. Whereas if desired an operator can pass the bolts 20 through the other direction and have the nuts 22 on the bottom.

Figure 5:
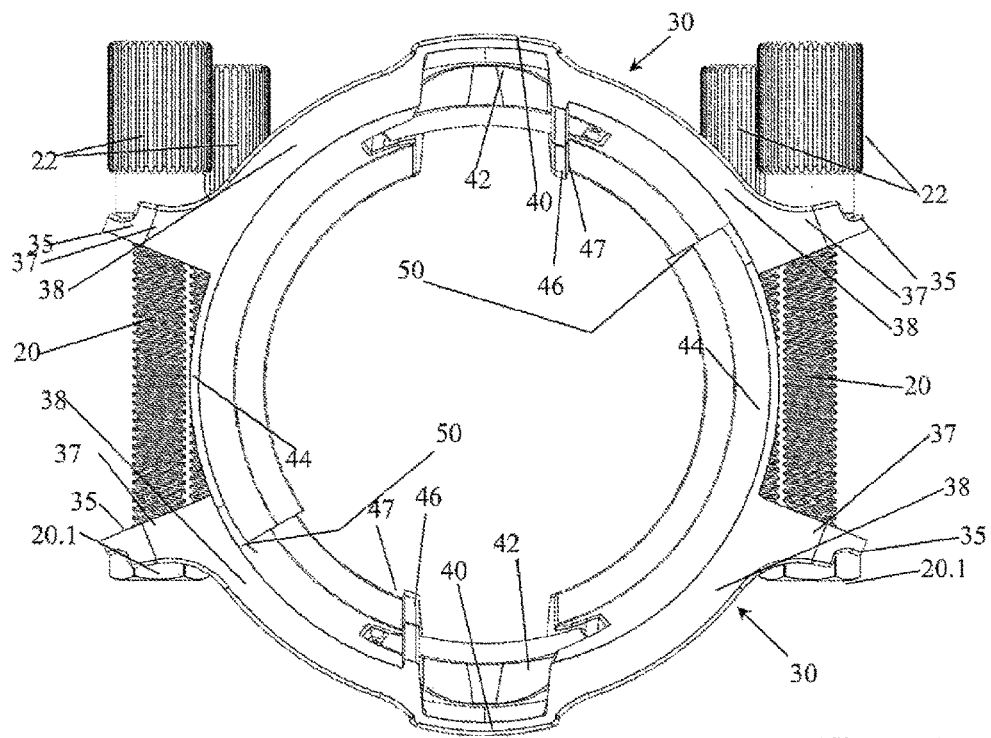
FIG. 5 is a front view of the device of FIGS. 3 and 4.

This is best illustrated in FIG. 17 where the hexagonal head is shown position between the opposed ribs 37. The angular spacing between the flange 35 on one side of a respective end flange 32 or 34 and the other flange 35 on the other side is approximately 135 degrees, and this is best illustrated in FIG. 5.

Approximately angularly midway between flanges 35 on the big and small ends is a channel portion 40 which extends in an axial direction and provides, on the inside portion of the shell, member 30, a channel 42. The purpose of the channel 42 will be described in more detail below. Each channel 42 is of the order of 6 to 10 mm in depth and approximately 15 mm in width of 30 to 40 mm in length. In the embodiment of FIG. 1 two opposed channels 42 are present on each shell member 30, but if desired a single channel of constant cross section, extending from the big end to the small end could be provided. The channels 42 are approximately 15 mm in so as to provide ease of installation and making it easier for the users not to have to strictly align the channel 42 with the oscillating driven end of the moving blade.

On one side of the shell member 30 is a part cylindrical skirt member 44 which extends away from the radial flange and side of the shell 30. In the preferred embodiment the skirt 44 extends from one side only.

Whereas on the other side of the channels 42 there is located a radially extending step or flange 46 which is positioned so that a radial abutment wall 47 is provided just adjacent to the channel wall 43 which is also radial with respect to the curve of the shells 30. The flange 47 provides a stop or abutment to prevent the extreme edge or periphery 50 of the skirt 44 from entering into the channel 42 which would otherwise decrease the usefulness of the channel 42.

At the "small end" of the device 10 the generally cylindrical construction of the big end or main portion 30.1 is reduced in diameter by a tapered or part conical section 30.2, which reduces the diameter down to the small diameter portion 30.3 at the small end. As best seen in FIG. 1 the skirt has similar diameter portions 44.1, tapered portion 44.2 and end diameter 44.3, which is smaller than the diameter 44.1.

As can best be seen from FIGS. 1 and 3, two individual shells 30 are placed so that their respective big ends 32 and little ends 34 are opposed to each other for assembly purposes.

On the flange portion 32 at the big end, approximately at the same width as the parallel flanges 38, is located a friction pad 60 whilst a similar friction pad 60 is on the diametrically opposite side of the assembly of the lower shell 30. The friction pads 60 are preferably made of natural rubber but can be any suitable material.

For convenience the shell of FIG. 2 has the friction pad 60 removed, to assist in showing that the friction pad is an optional feature. Whilst it is optional, the use of the friction pad 60 of a polymeric material such as natural rubber or soft polyurethane, which is applied by a means of adhesive or double sided tape to the shells 30, helps to produce friction when the device 10 is attached to a neck of a rotating power tool such as a drill or electric screwdriver at either the big end or the small end. Whilst at the opposite end connection to the cylindrical neck or body of a power cutting tool for use with this device, the friction pads 60 at the other end allow for good grip to be made to the respective portions.

Figure 6:
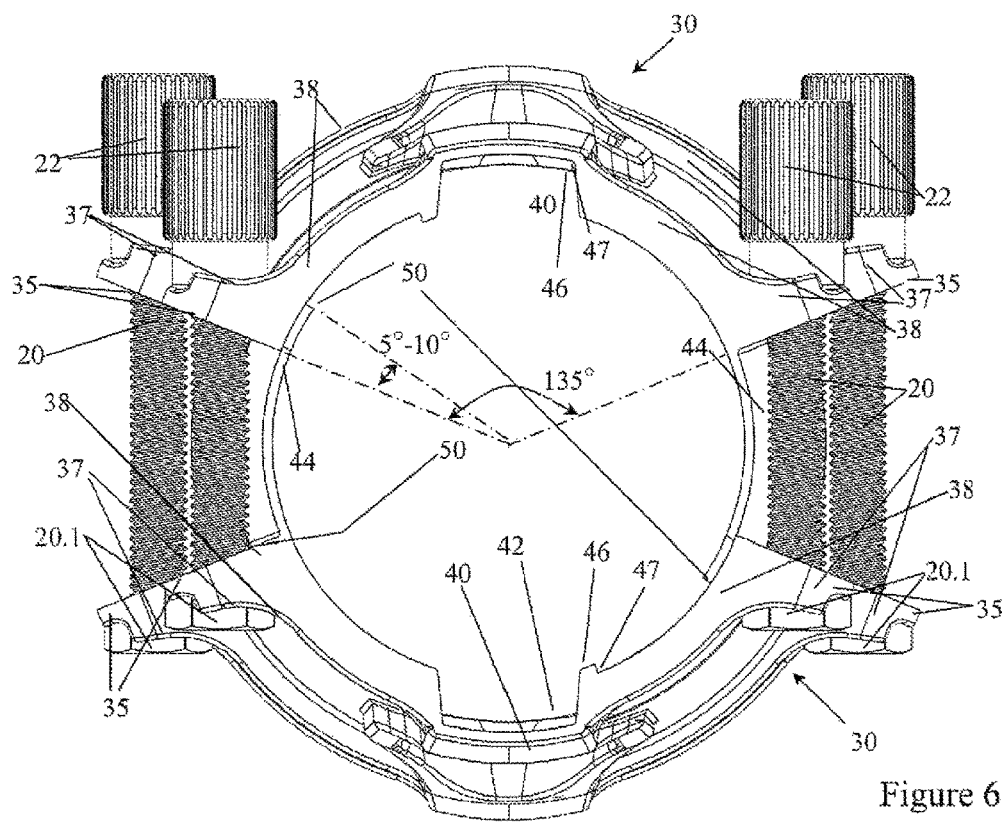
FIG. 6 is a rear view of the device of FIGS. 3 and 4.

From FIGS. 5 and 6 it can be seen that the channels 42 at the respective ends can be seen to provide a channel at those respective ends.

As is best illustrated in FIG. 1, the skirt 44 extends circumferentially away from the shell 30, starting at the centrally located radial flange 35, by an angular distance of approximately 55 to 65 degrees from the radial flange 35. This ensures as is illustrated in FIGS. 5, 6 and 7 that when two shells 30 are brought together and loosely assembled with machine screws 20 and nuts 22, approximately 2 to 5 degrees of overlap, approx. 2 to 5 mm of overlap, will exist between the periphery 50 of the skirt 44 and the base of the flange 35 as indicated in FIG. 6.

Figure 7:
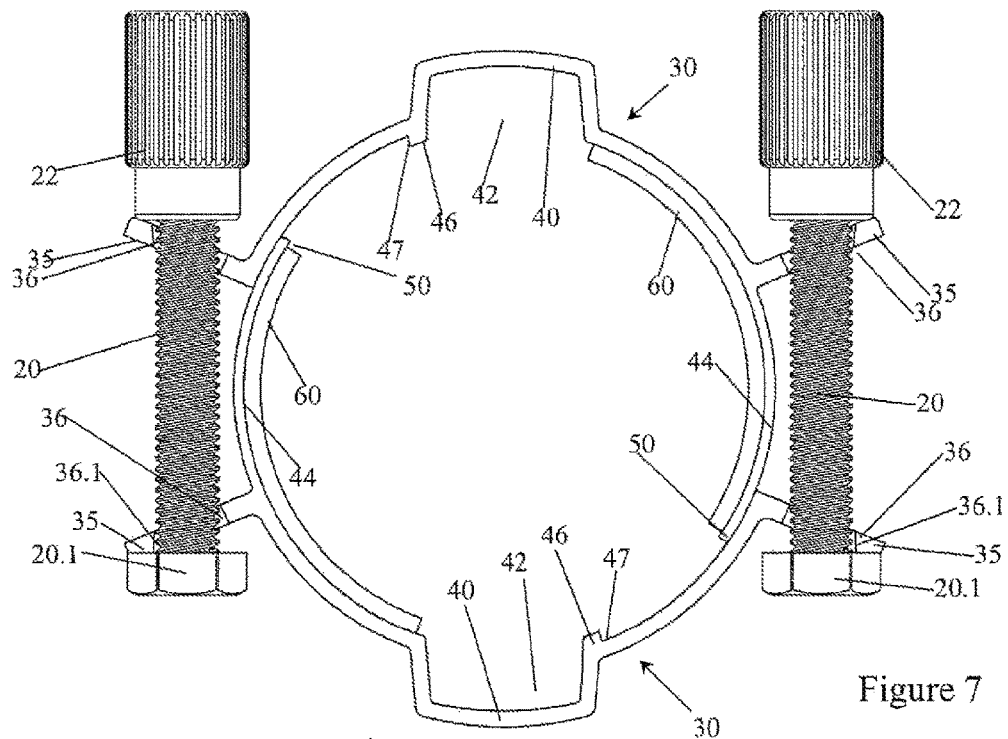
FIG. 7 is a cross section through the device of FIGS. 3 and 4.
Figure 8:
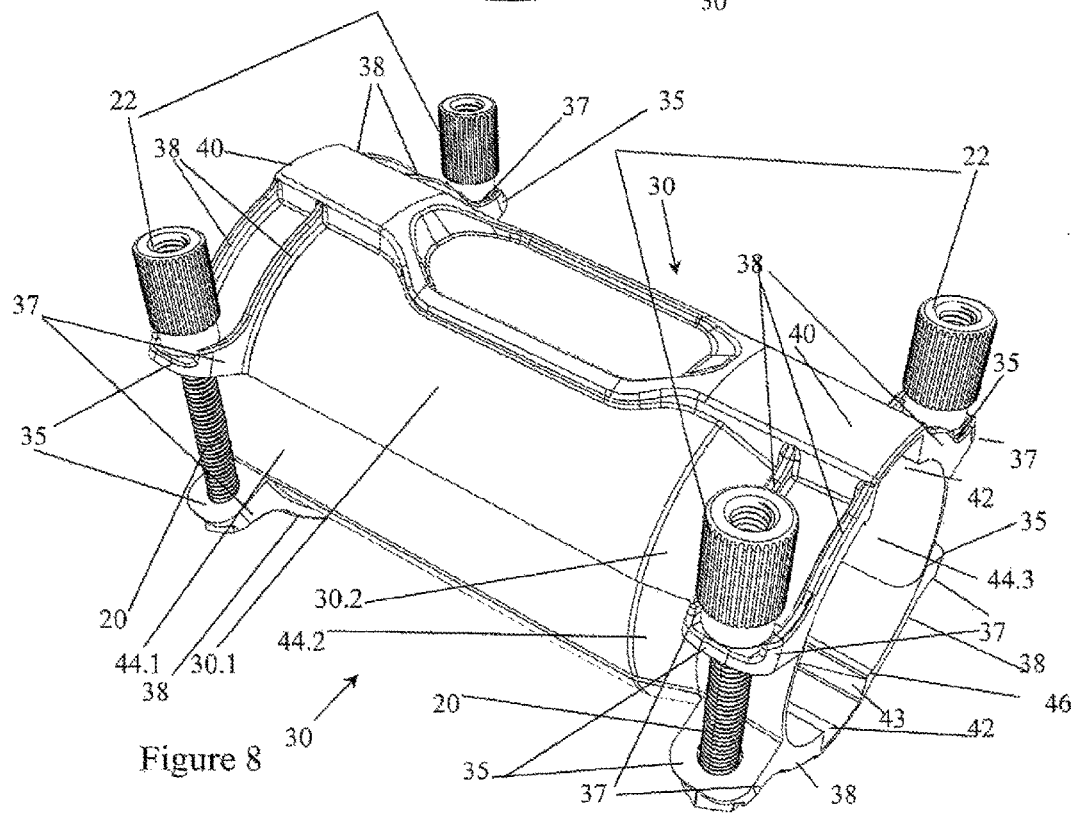
FIG. 8 is another front perspective view of the device of FIGS. 3 and 4 where friction pads are removed or not yet assembled.

As is best illustrated in FIG. 7, the apertures 36 need not have a circumferential wall which is axially oriented with respect to the plane of the hole. Instead, the outer side of the hole 36 can include an angled side 36.1 so that when the two shells 30 are preassembled as in FIGS. 6 and 5, then as best illustrated in the cross section of FIG. 7, the shank of the machine screw 20 will readily pass through the apertures 36, and as the flanges 35 rotate relative to the shank of the machine screw 30 as the nut 22 is secured (because the head 20.1 of the machine screw 20 is prevented from being rotated relative to or by the ribs 37) the edges or corners of the holes 36 will slide easily along the threaded shank of the machine screw 20.

Figure 16:
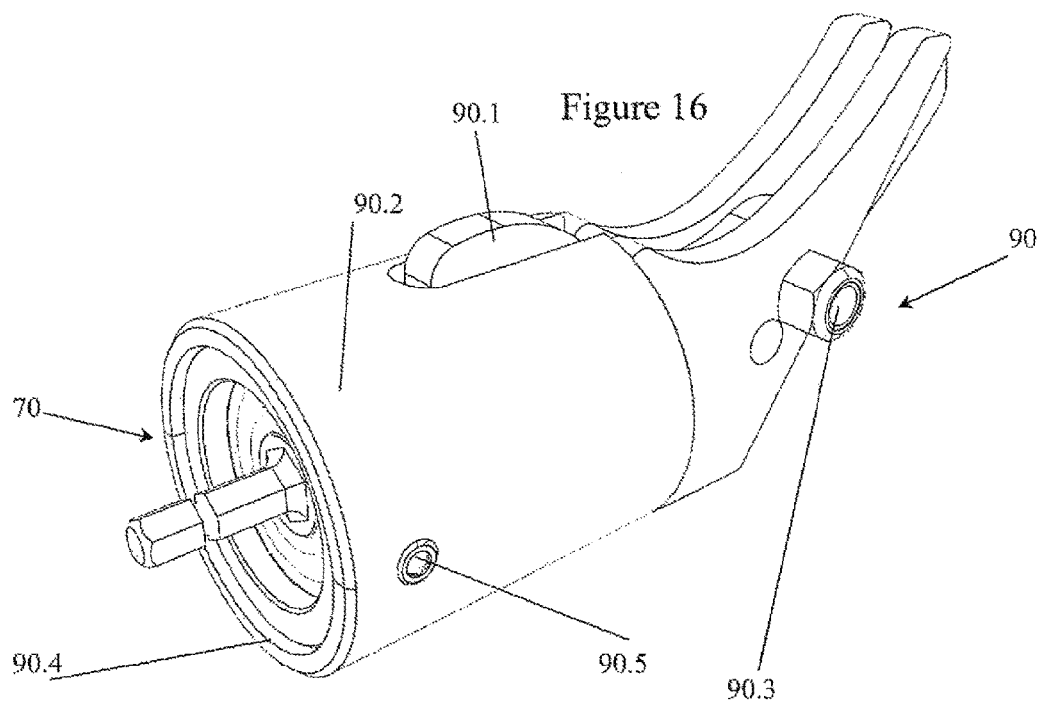
FIG. 16 illustrates the drive assembly of previous figures mounted into the cylindrical body of an oscillation driven cutting tool, in this instance a three bladed cutter.

Illustrated in FIG. 16 is an example of a tool 90 that can be utilised with a device 10 of the previous figures and description. The tool 90 in FIG. 16 is of a fibreboard cutting type whilst in FIG. 9 the cutting tool 90 is of a metal shear type. Details of which are described in the previously mentioned specifications which are incorporated herein by reference. That description details how the cutting end and cutting tool per se can be constructed.

Figure 13:
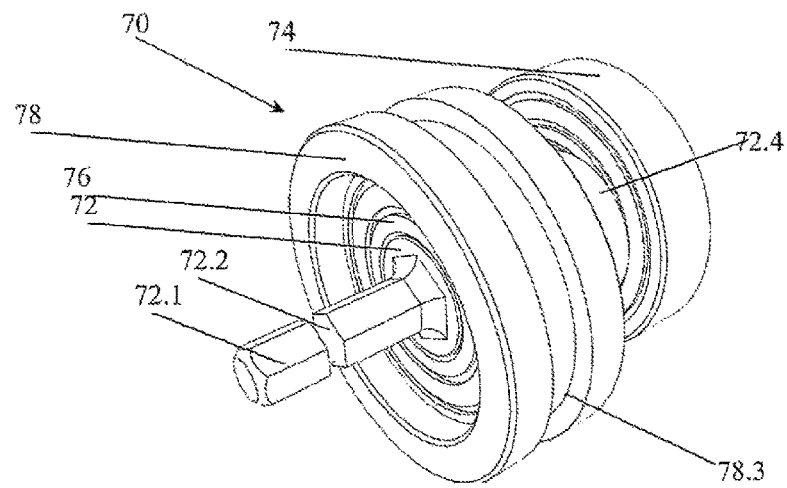
FIG. 13 illustrates a rear perspective view of a drive assembly for an oscillation driven cutting tool.
Figure 14:
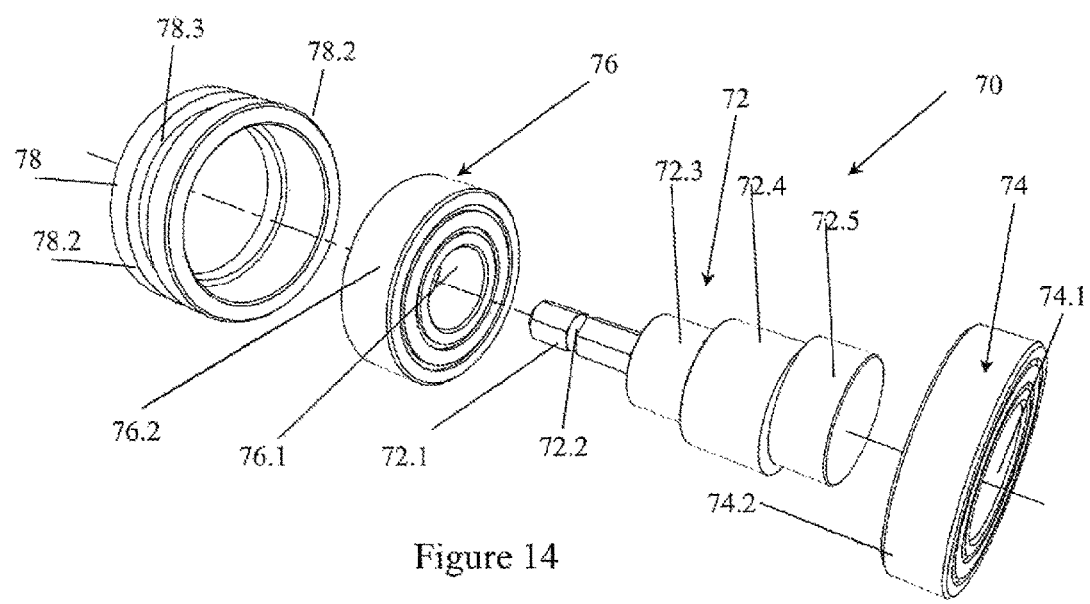
FIG. 14 illustrates a rear exploded perspective view of the drive assembly of FIG. 3.
Figure 15:
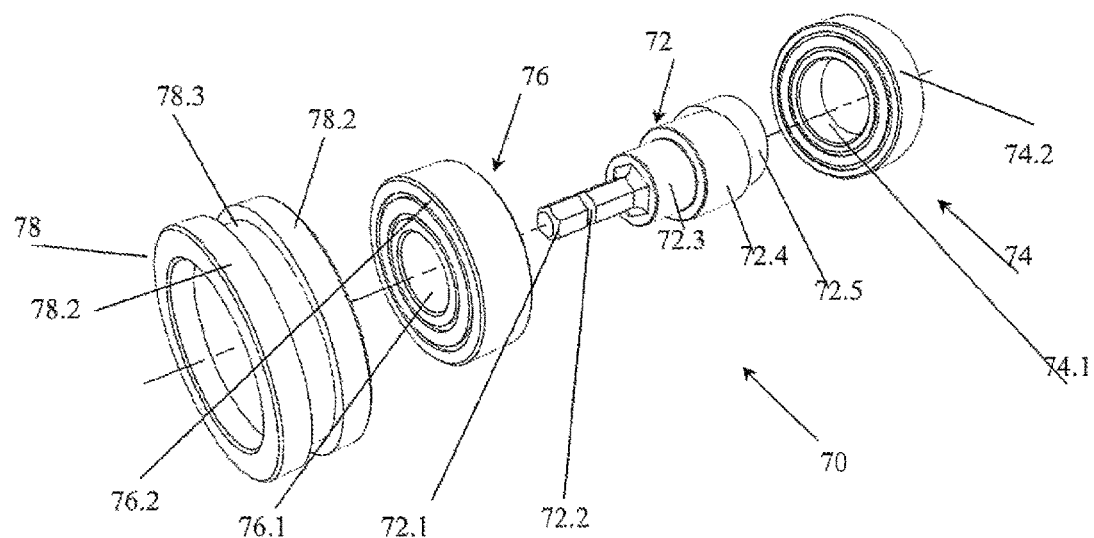
FIG. 15 illustrates a front exploded perspective view of the drive assembly of FIG. 13.

The tool 90 of FIGS. 16 and 9 include a drive assembly 70 which is better illustrated in FIGS. 13 to 15 inclusive. The drive assembly 70 comprises a drive shaft 72, an eccentric bearing 74, a drive bearing 76 and a collar 78. The shaft 72 is a complex shape which has a hex drive 72.1 with a peripheral groove 72.2 therein. The hex drive 72.1 is preferably of the 6 mm or ¼ inch across flats size so that the hex drive 72.1 can be inserted into most modern keyless and keyed chucks and hex drivers so as to provide rotary motive power to the cutting tool 90. At the forward end of the hex shaft 72.1 is a cylindrical bearing mount 72.3 to receive the inner race 76.1 of bearing 76 and then a cylindrical spacing shaft 72.4 at the end of which is an eccentric drive shaft component 72.5.

The drive shaft component 72.5 has a circumferential diameter to receive the inner race 74.1 of bearing 74. The outer race 74.2 of bearing 74 causes the movable arm 90.1 to oscillate relative to the body 90.2 of the tool thus causing a cutting action on the other side of the cutting tool pivot 90.3. The outer race 76.2 is of a diameter to fit inside the inner diameter 78.1 of the collar 78 while the outside circumference 78.2 of the collar 78 is sized so as to be able to fit the inside circumference 90.4 of the body 90.2.

The outer surface of the collar 78 includes a circumferential groove 78.3 which allows two grub screws 90.5 (a second grub screw is at the 90 degree mark relative to the grub screw 90.5 but is not visible in the drawings) or similar securing screw which will enter the groove 78.3 when the assembly of FIG. 13 is inserted so that the oscillating bifurcated arm 90.1 is positioned either side of the diameter of the bearing 74 and collar 78 is inserted into the inner circumference 90.4 at the tool 90's rear end and the groove 78.3 aligned with the grub screw 90.5, whereupon the turning of the grub screw 90.3 to enter into the channel 78.3 will ensure that the drive assembly 70 is secured relative to the body 90.2.

Figure 33:
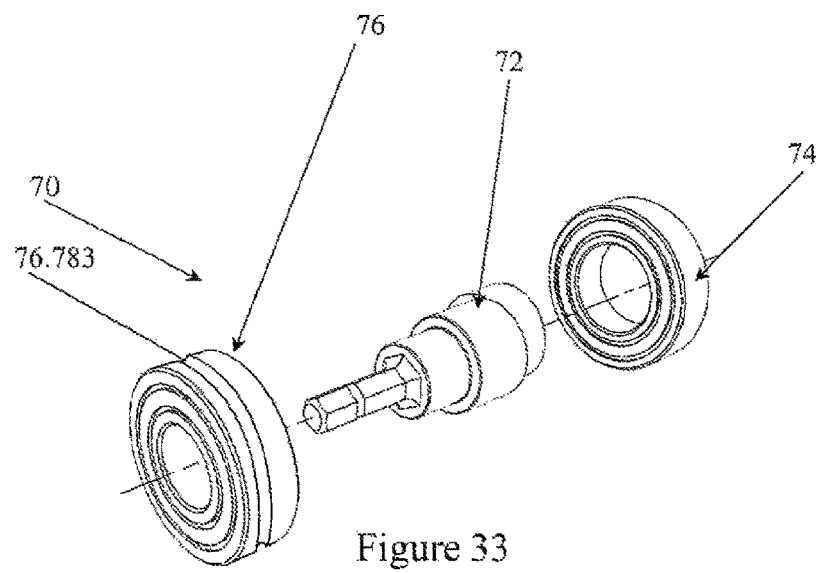
FIG. 33 is a drive assembly similar to that of FIGS. 13 to 16, except that the race of the drive bearing has a circumferential groove.

Illustrated in FIG. 33 is a drive assembly 70 similar to that described above in respect of FIGS. 13 to 15, except that the main drive bearing 76 has a groove 76.783 and does not utilise a collar 78. The groove 76.783 is of a size and shape similar to that of groove or channel 78.3 in FIGS. 14 and 15, and the outer diameter of the outer race of the main bearing 76 in FIG. 33 is sized so as to be able to be inserted is securable into the inner diameter 90.4 at the rear of the tool body 90.2.

As illustrated in FIG. 6, the desired underlay or overlap between the skirt 44, terminus 50 and the flat surface of the flange 35 is of the order of approximately 2 to 10 mm which translates to approximately 1 to 5 degrees of arc.

The overall length of the device 10 is approximately 125 mm and other than the ribs 37 and 38 and flanges 35 which are approximately 2 mm in thickness, the majority of the shell is manufactured from 1.5 mm thick polypropylene.

Figure 26:
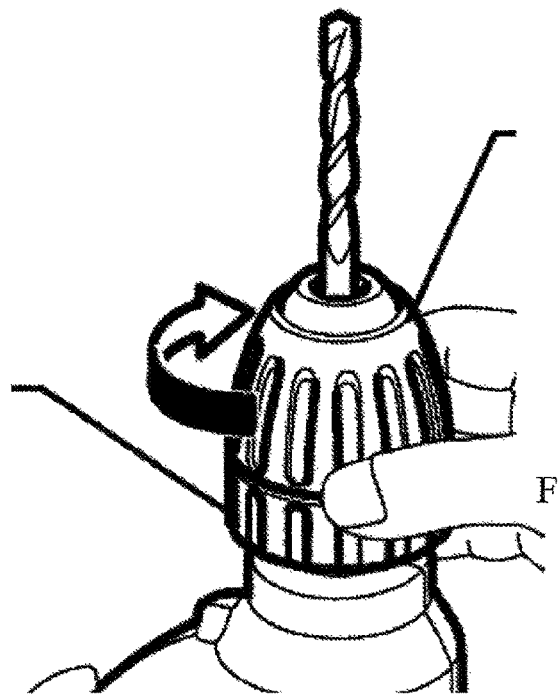
FIG. 26 illustrates a perspective view of a chuck and drill where the chuck has a greater diameter than the neck of the drill.
Figure 27:
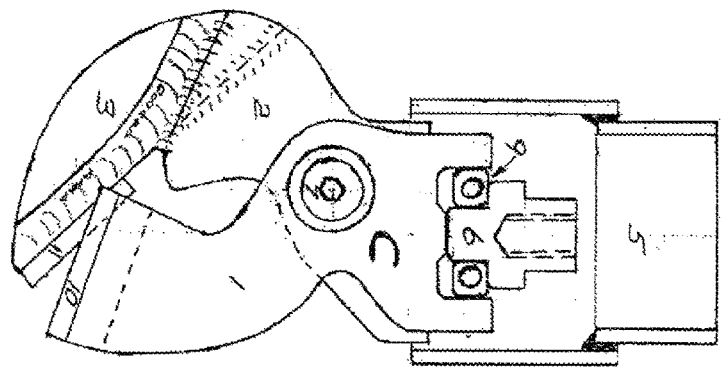
FIG. 27 illustrates a cutting tool in cross section which has the oscillating blade which oscillates wholly within the cylindrical body of the tool.
Figure 34:
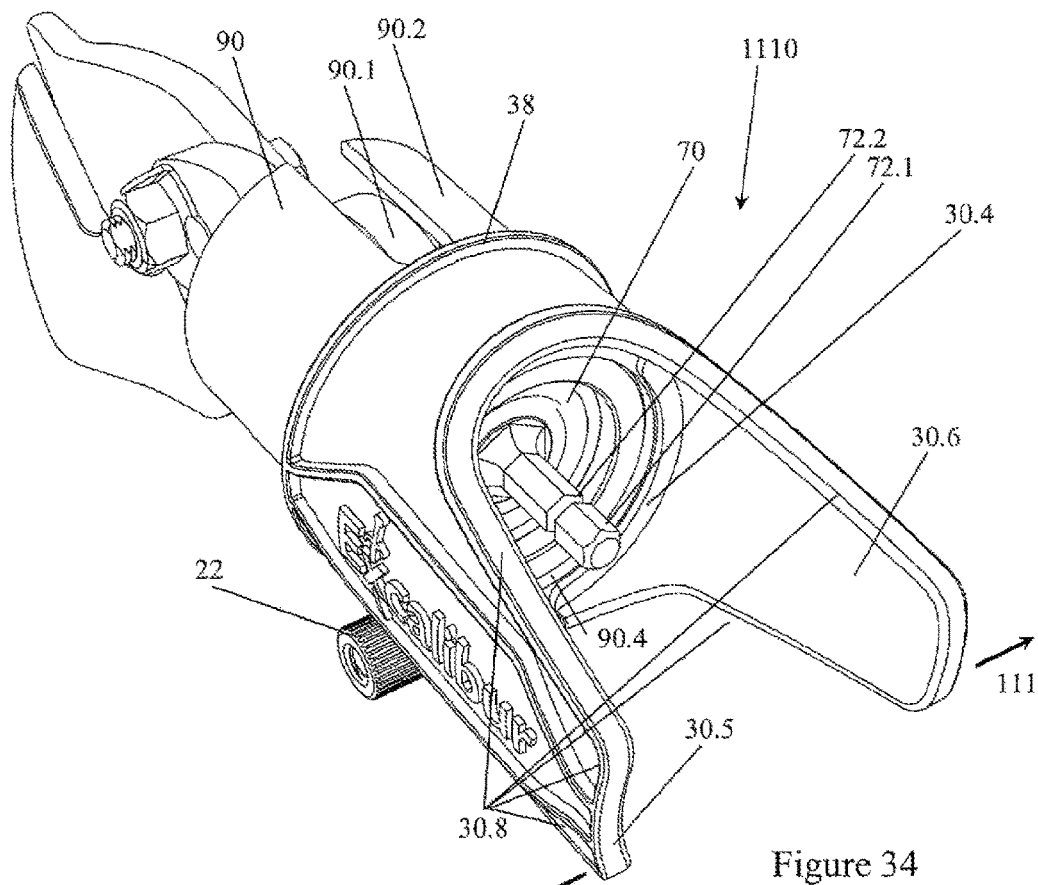
FIG. 34 illustrates a rear perspective view of another embodiment of a connection device or tool assembled to a cutting tool.
Figure 35:
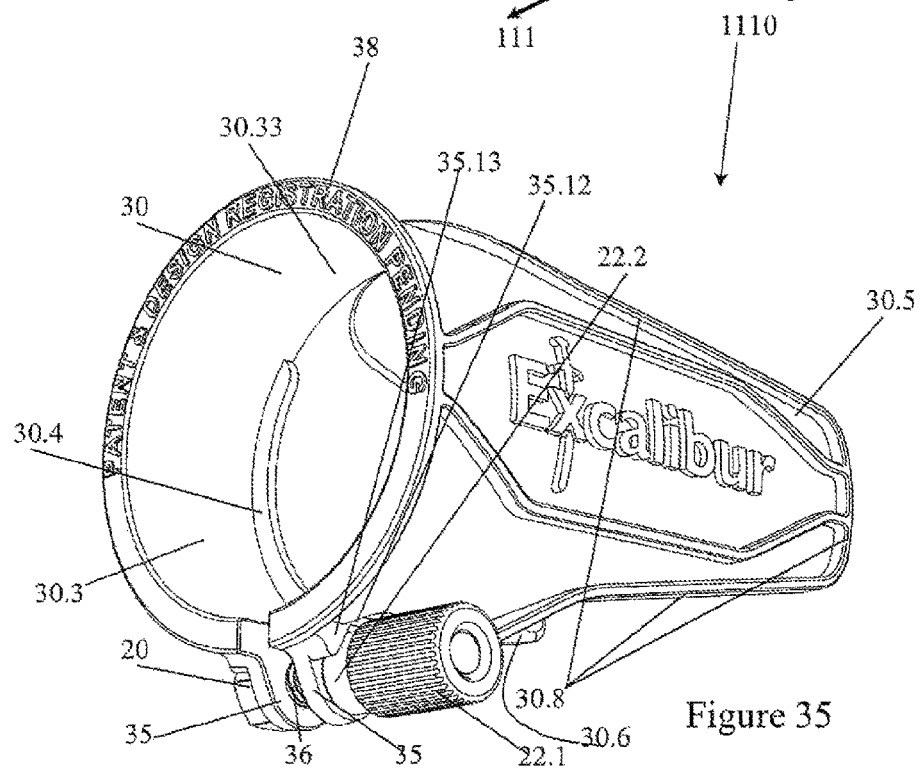
FIG. 35 illustrates a front perspective view of the connection device or tool of FIG. 34, with the cutting tool removed.
Figure 36:
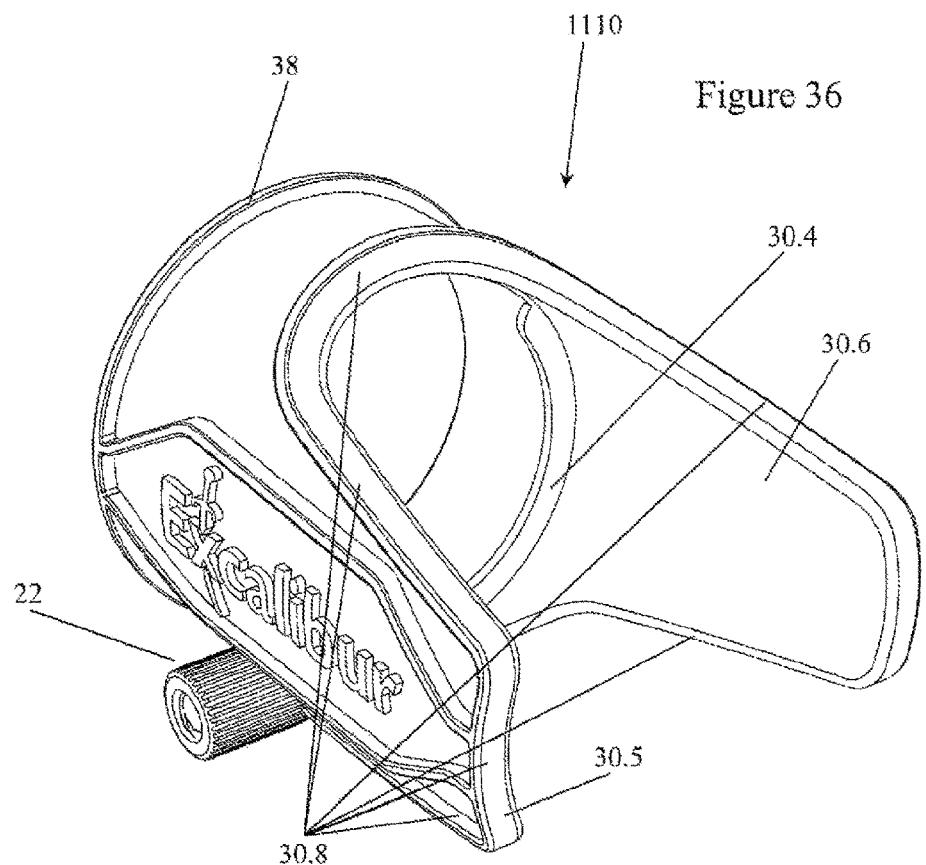
FIG. 36 illustrates a perspective view of the rear of the device or tool of FIG. 35.
Figure 37:
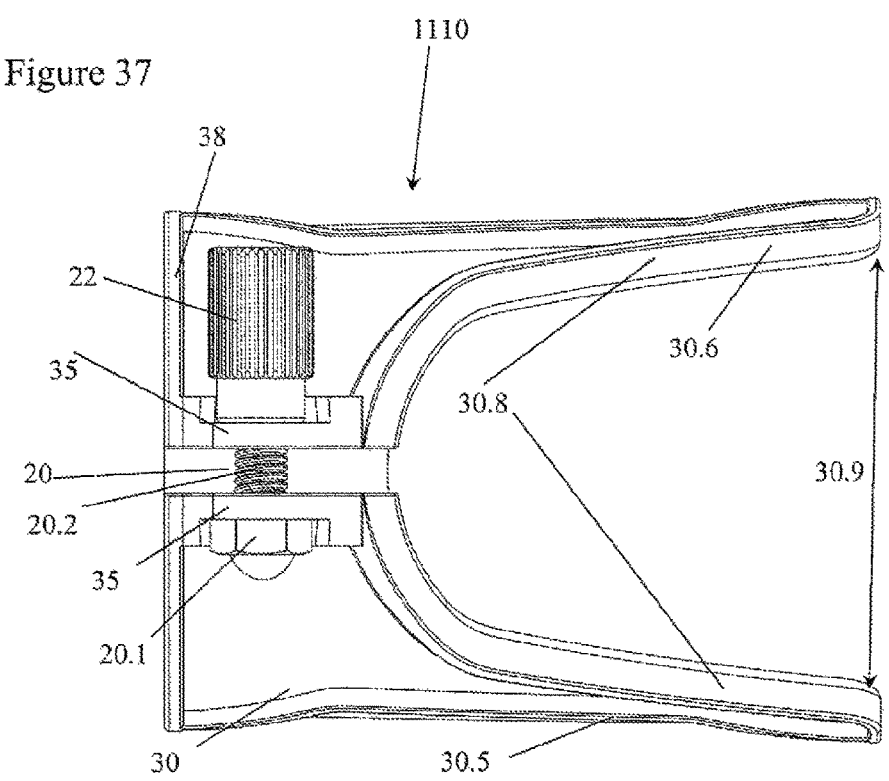
FIG. 37 illustrates an underneath view of the device or tool of FIGS. 35 and 36.
Figure 38:
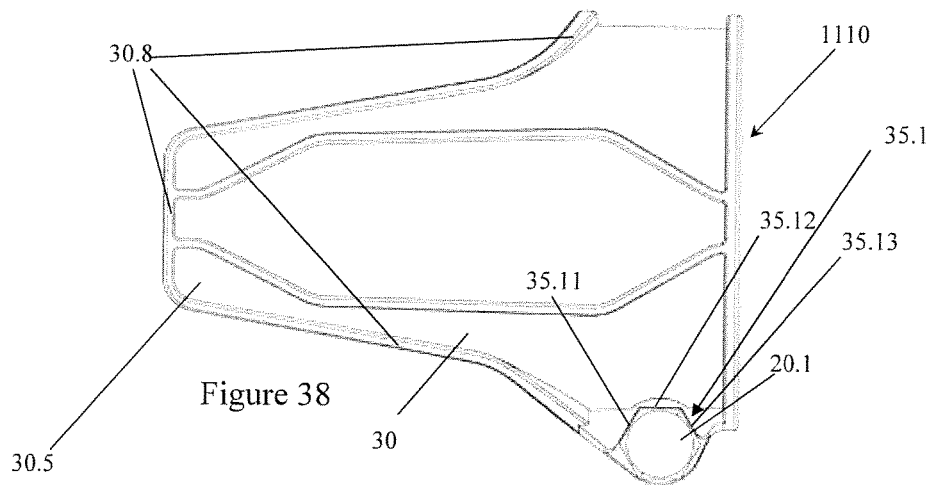
FIG. 38 illustrates a side view of the apparatus of FIGS. 36 and 37.

The reduced diameter cylindrical surface 30.3 is provided together with the taper 30.2 because many drill units are such that a neck 82 on the body is of smaller diameter than the outside diameter of the chuck 84, as is illustrated in FIG. 26. The outside diameter of the large diameter portion 30.1 is sized so as to be able to attach to an approximately 65 mm diameter neck or tool down to a 50 mm diameter neck or tool. Whereas the small diameter section 30.3 is of a size to receive a tool or neck of approximately 50 mm down to approximately 40 mm. The tapered portion 30.2 is approximately 20 mm in length while the flange regions 32 and 34 between the outside surfaces of the ribs 38 is approximately 12 mm in dimension.

Figure 10:
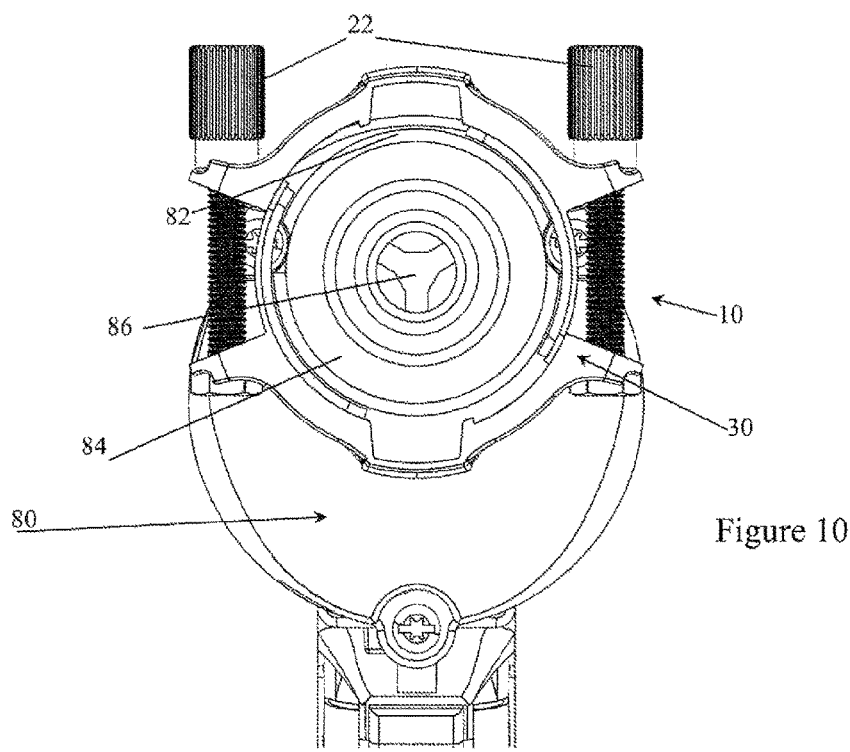
FIG. 10 is a front view of the assembly of FIG. 9.
Figure 11:
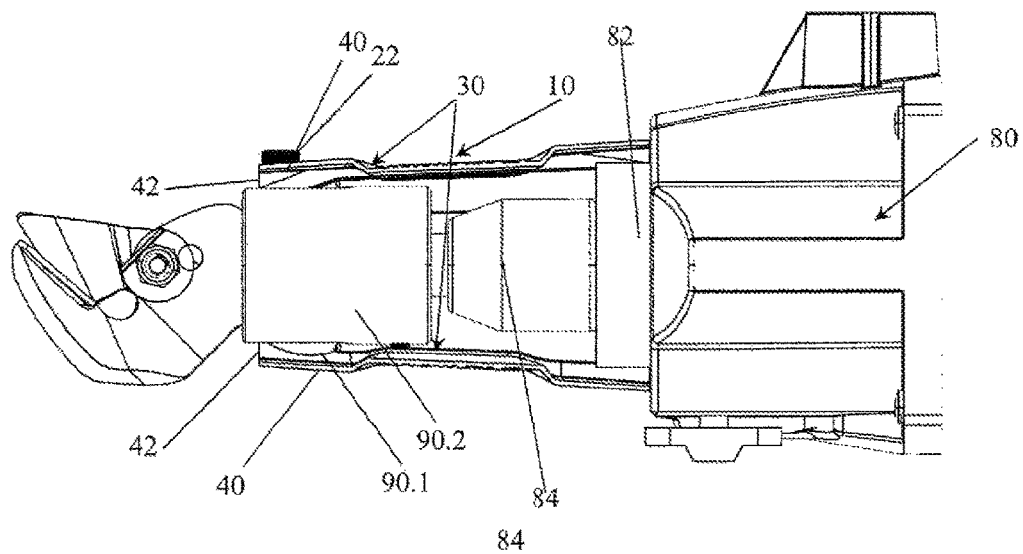
FIG. 11 is a partial cross sectional view showing the device of previous figures engaging a drill which has a neck of larger diameter than the body of the cutting tool.

As illustrated in FIGS. 9, 10 and 11, the assembly procedure first requires the drive assembly 70 to be inserted into the cylindrical cavity in the rear of the body 90.2 of the tool 90 and then secured in place by the grub screws 90.5, two off at 90 degrees spacing from each other (but only one is illustrated in the drawings).

The tool 90 is attached to the drill 80 by the hex shaft 72.1 being inserted into the jaws 86 and secured by means of the chuck 84 to the drill, whether keyed or keyless, and the chuck tightened up firmly. Once in this condition, the tool 90 is oriented or rotated relative to the drill body to the position desired by the operator when in use.

It is best to fit the device 10 to the cutting tool 90's body first. The big end 32 of the device 10 is preferably attached to whichever is the larger of the diameter of the body of the tool 90 or diameter of the neck or other part of the drill 80.

Battery drills are usually of a larger diameter than the cutting tool 90. So, with most battery drills the big end 32 of the device 10 connects to the drill and the small end 34 connects to the cutting tool 90 body, and it is preferred due to the larger diameters involved or the drill, that 50 mm screws 20 are utilised. Whereas for electric drills 80 as illustrated in FIGS. 9 to 12, these usually have a plain neck 82 located behind the chuck 84, which is of smaller diameter than the tool 90. So, with most electric drills, the small end 34 of the device 10 goes to the neck 82 of the drill 80 and the large end 32 of the device 10 goes to the cutting tool 90 body, and it is preferred due to the smaller diameters involved that 35 mm screws 20 are utilised.

The user will place the two shell members 30 around the tool 90 body with the clearance channels 42 over the protruding backs of the moving blade 90.1. This will prevent the blade ends 90.1 from hitting the device 10. The user will then insert two of the screws 20 at the tool 90 end of the device 10 and tighten the thumb nuts 22. Once done the user will Turn the whole assembly to whatever angle is required, and will insert the other two screws 20 at the drill 80 end of the device 10 and tighten the thumb nuts 22. The assembled tools 80, 10 and 90 are now ready to use.

Figure 25:
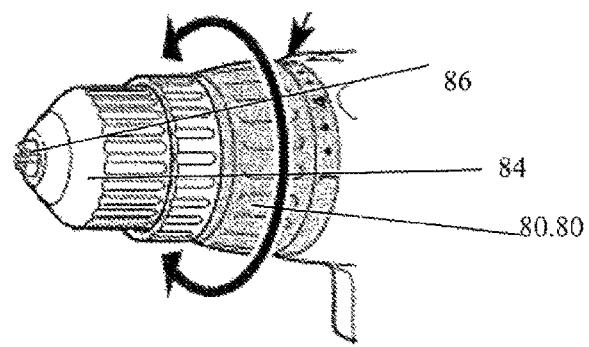
FIG. 25 illustrates a perspective view of a cordless drill with a torque control ring to which the device of previous figures can be attached.

With most battery drills, such as those illustrated in FIG. 25, the drill end of the device 10 will be secured to the torque control ring 80.80. If this ring 80.80 rotates during operation, the user can turn the ring 80.80 to its end position and relocate the device 10 to suit. If necessary, the user can change the direction switch of the drill so that it turns the ring 80.80 to the maximum torque setting position Once the drive assembly and tool 90 are in the jaws of the chuck 84, an alternative assembly procedure would be to have the connecting device 10 in a partially assembled state, whereby the screws are out to their maximum distance from the heads on the machine screws 20. In this condition the device 10 could be slid over the cutting tool 90, over the chuck 84 and the flange 32 located onto the neck 82. Such an assembly depends on the cutting geometry of eth cutting tool 90 and may not be able to be utilised with some cutting tools.

It will be noted from FIGS. 9 and 11 that that the big end 32 of the device 10 is located for positioned on the drill 80.

As discussed above, once the device 10 is on the body of cutting tool 90 the device 10 is rotated so that the channels 42 align with the driven end of the movable cutting blades 90.1 so that as the blade portions 90.1 oscillate in and through the body 90.2 of the tool 90, any movement past the outer diameter of the body 90.2 will enter into the channel 42.

As the screws 20 and nuts 22 are secured, the skirts 44 respectively underlay the respective other sides of the shell members 30 and as the nuts 22 continue to be tightened, the friction material 60 will grip onto the respective surfaces on neck 82 and body 90.2 while at the same time clamping the assembly in a circular fashion to the respective neck and body 90.2.

Once secured the operator can control the drill 80 and the cutting device 90 as needed. It will be noted in the embodiments of FIGS. 9 and 11 that the oscillating cutting tool 90 illustrated is of the metal shear variety.

The construction of the connection device 10 is such that each of the shell members 30 once secured in place by the nuts 22 and machine screws 20 forms a concentric clamping device around both the neck 82 of the drill 80 and the body 90.2 of the tool 90. A particular advantage of the device 10 is that dust, swarf and dirt are prevented from gaining access to the inside area of the shell along the majority of the length of the device 10. The only avenues of ingress are via the open ends of the channels 42 which are relatively small by comparison to the overall dimensions of the device 10. Another advantage of the skirt 44 is that it prevents ingress of a user's, or other person's fingers or other objects from outside the device 10 into the central portions through the interface between the opposed flanges 35 and the side peripheries of the shells 30 if the skirts were otherwise not present, as is the case with the embodiment of FIG. 19, as will be described below.

As is best illustrated in FIG. 11, it can be seen that the oscillating blade 90.1 has sufficient room in each channel 42 to move into and out thereof so as to not disrupt the operation of the shear tool 90. FIG. 11 helps to show the dimensional relationship between the neck 82, chuck 84 and tool body 90.2 and in the instance of FIGS. 9 to 11, the neck 82 is larger than both the chuck 84 and tool 90.2.

Figure 12:
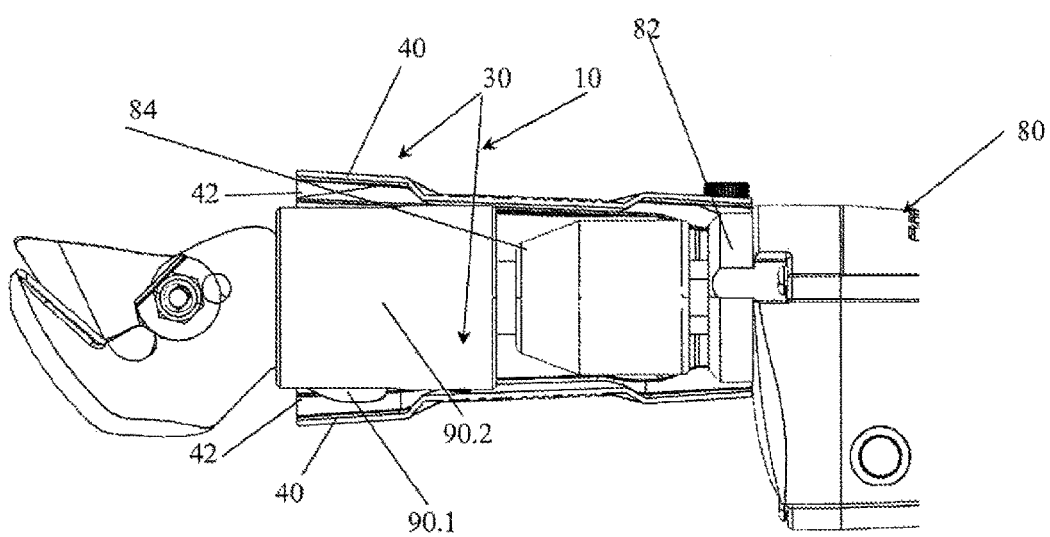
FIG. 12 is a partial cross sectional view showing the device of previous figures engaging a drill which has a neck of smaller diameter than the body of the cutting tool.

Whereas by contrast, in FIG. 12, the neck 82 is also larger than the chuck 84 whereas the body 90.2 is larger than each of these items. In this respect, another advantage of the connector device 10 is that by reversing the device 10 so that the small end 34 engages the drill 80 and the large diameter end 32 can be used to engage the tool 90.

A third arrangement also possible and as mentioned previously and as illustrated in FIG. 26, is that the drill neck 82 is of a smaller diameter than the chuck 84, in which case the small end 34 of the device 10 can be used to engage the drill neck and the tapered surface 30.2 allows the opening out of the device body to accommodate a larger diameter chuck 84 by comparison to the neck 82.

By manufacturing the majority of the shell 30 from 1.5 mm thick polypropylene and by providing relatively strong flanges 32 and 34, the portions of 1.5 mm in thickness allow sufficient circular deformation or conformation to occur which allows securement to the neck of the drill and body of the cutting tool, while those portions of the shells 30, between the flanges 32 and 34, are readily able to conform or elastically deform or plastically deform under the various geometric arrangements of the neck diameter, chuck diameter and cutting tool diameter, so that the connection device 10 will work in a multitude of geometric size arrangements.

Figure 18:
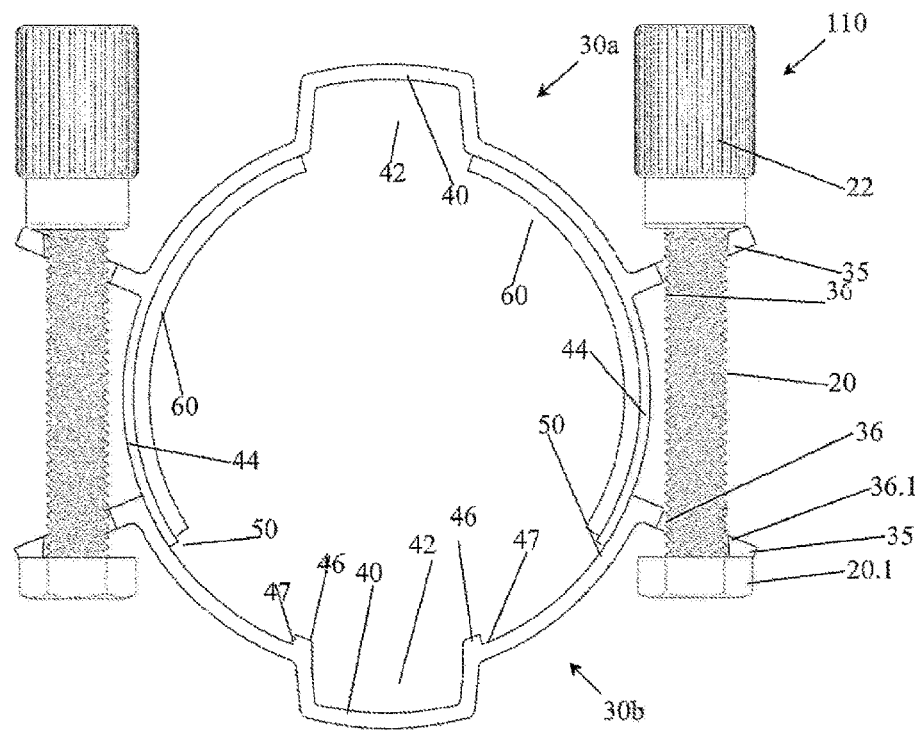
FIG. 18 illustrates connection device having a modified construction to that of previous figures, where the upper and lower shell members are not identical and the upper shell has two skirts.

Illustrated in FIG. 18 is a cross section through a device 110 wherein the shells 30a and 30b are not identically shaped. In the illustration of FIG. 18 the upper shell 30a has two skirts 44 extending from opposite locations whilst the other shell 30b has no skirt 44. In this instance the longitudinal flange 46 and abutment face 47 are located on both sides of the channel 42 to prevent the peripheral ends 50 of the skirts 44 from entering into the channels 42 which would otherwise cause those channels to be partially occluded whereby the oscillating arm 90.1 of the tool 90 would not be able to enter into the channel 42 during its oscillating motion or operation.

Figure 19:
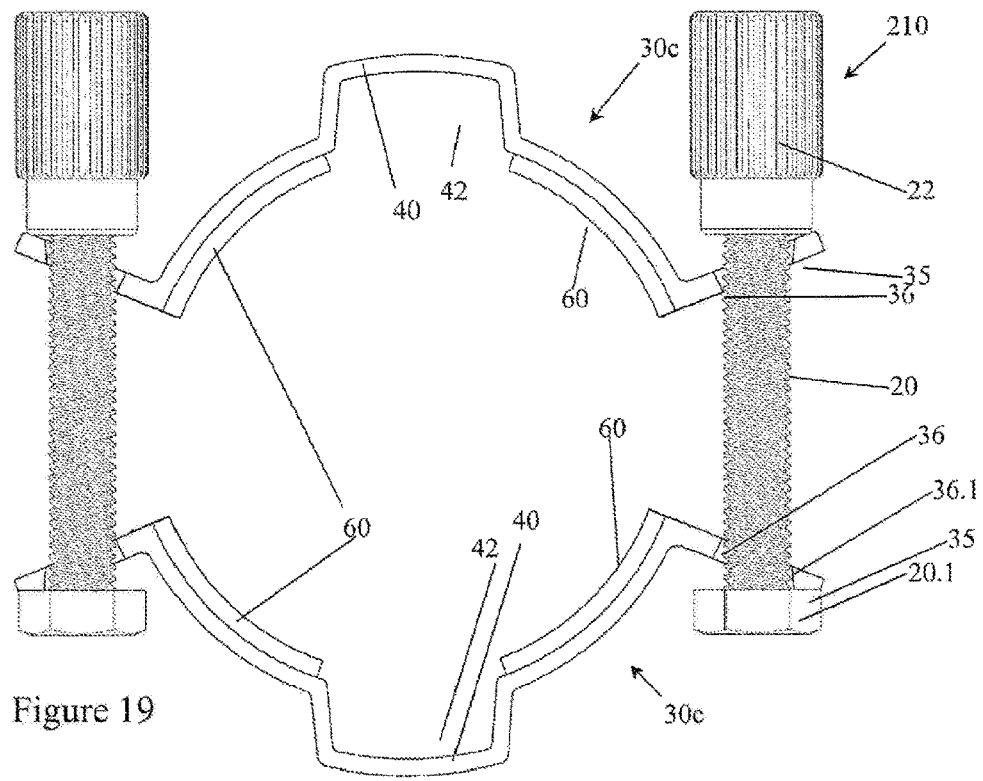
FIG. 19 illustrates a cross section through another connection device having identical upper and lower shell members but no skirts.

Illustrated in FIG. 19 is a cross section of through a device 210, where the skirts 44 are not present at all and the shells 30c and 30c are identical, and 4 friction pads 60 are provided on each shell 30. This embodiment by not including skirts 44 and by not providing a degree of overlap or underlay between the shells 30c, will not provide the protective advantages of the embodiment of FIG. 1, but will still be a useful to secure the tool 90 to the drill 80.

Figure 20:
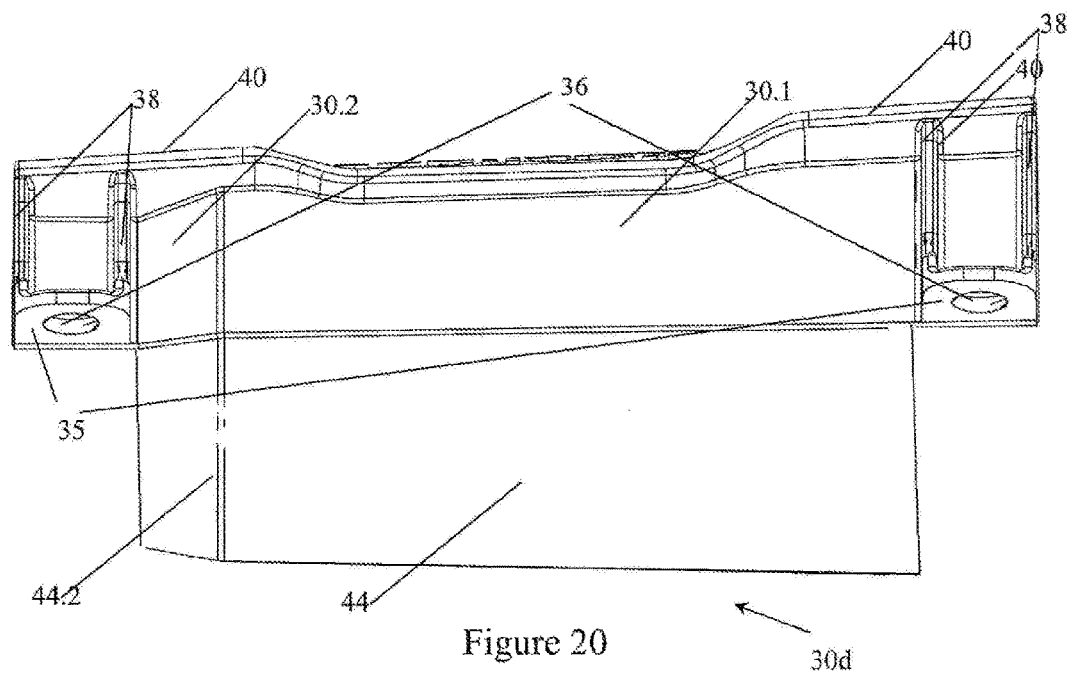
FIG. 20 illustrates a side view of an shell for another connection device which has identical upper and lower shells and skirts which are meant to be externally located on the assembled device as in the cross section of FIG. 21.
Figure 21:
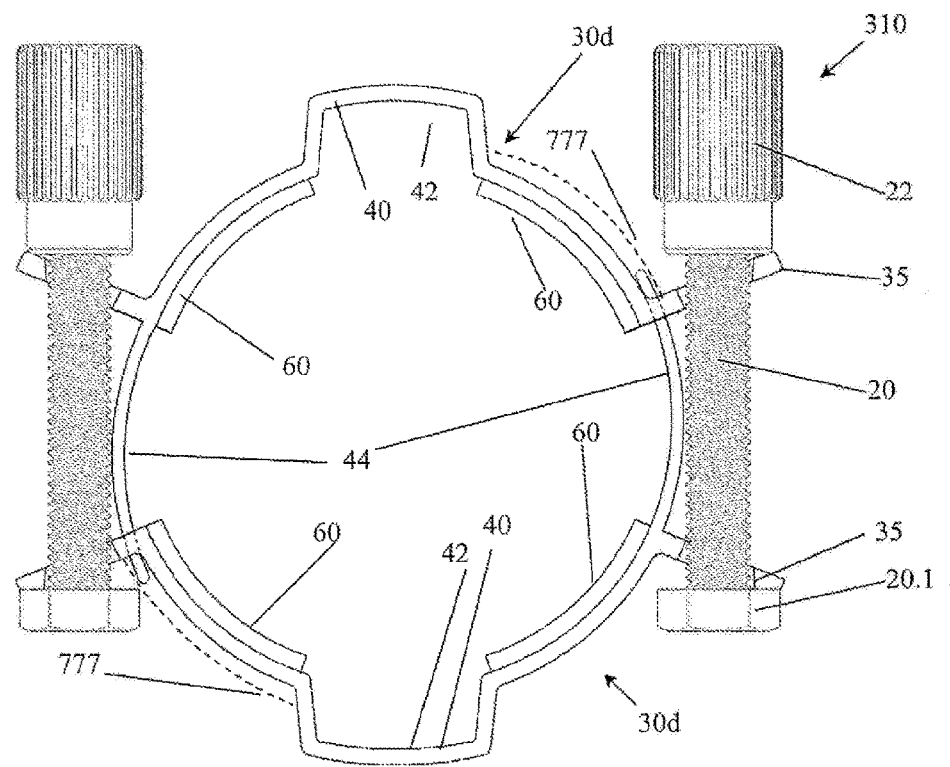
FIG. 21 illustrates a cross section of an assembly of two shell members of FIG. 20.

Illustrated in FIGS. 20 and 21 are a side view a shell member of another device 310, and a cross section through the assembled device 310. The device 310 differs from the devices of FIGS. 1 and 18, in that the skirts 44 are shaped so as to be externally located relative to the opposite shell 30d. The shells 30d are identical. As illustrated in FIG. 21 the cross section indicates a pocket member 777 which could be provided on the shell 30d, so as to receive the free end of the skirt 44 so as to maintain the lines and appearance of the device 310. It will be noted in this embodiment that each shell 30d includes two friction pads 60 on each end of each shell.

Figure 22:
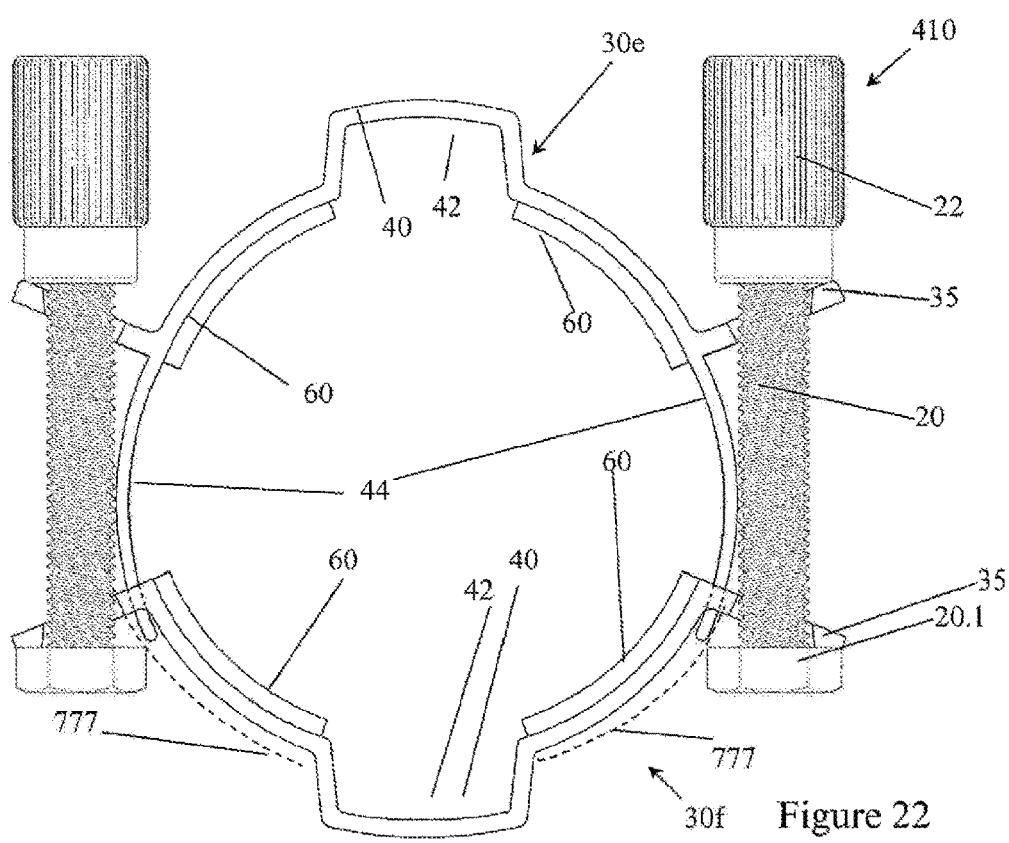
FIG. 22 illustrates a cross section of an assembled device where the upper and lower shell members are not identical, the upper shell having two skirts and the lower shell member being similar to a shell member of FIG. 19.

Illustrated in FIG. 22 is a device 410 which is similar to that of devices 310 and 110 of previous figures in that the upper shell 30e is not identical to the lower shell 30f, and the upper shell 30e has two skirts 44 and the skirts 44 act and interact with and remain externally of the lower shell 30f. If desired the lower shell can include two pockets 777 to receive the free ends of the skirts 44.

Figure 23:
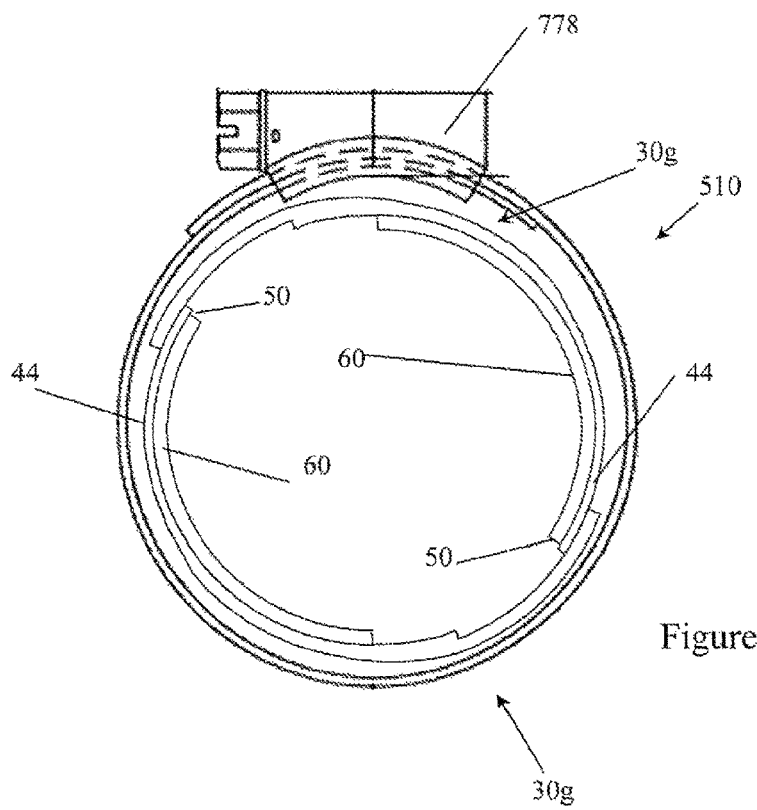
FIG. 23 illustrates a cross section of identical upper and lower shell members each having a skirt portion, but the shells do not have machine screw or machine screw flanges, but are clamped together by cylindrical or circumferential clamps.

Illustrated in FIG. 23 is a connection device 510 which has identical shell members 30g which include skirts 44, but the radial flanges 35 of other embodiments are not present. Only the ribs 38 are present and the space between the ribs 38 is used to locate a cylindrical or circumferential clamp such as a pipe clamp 778, which is used to circumferentially secure the shells and skirts to the neck 82 of a drill 80 and tool 90. It will be noted that a total of four friction pads 60 are utilised, two attached each shell 30g.

Figure 24:
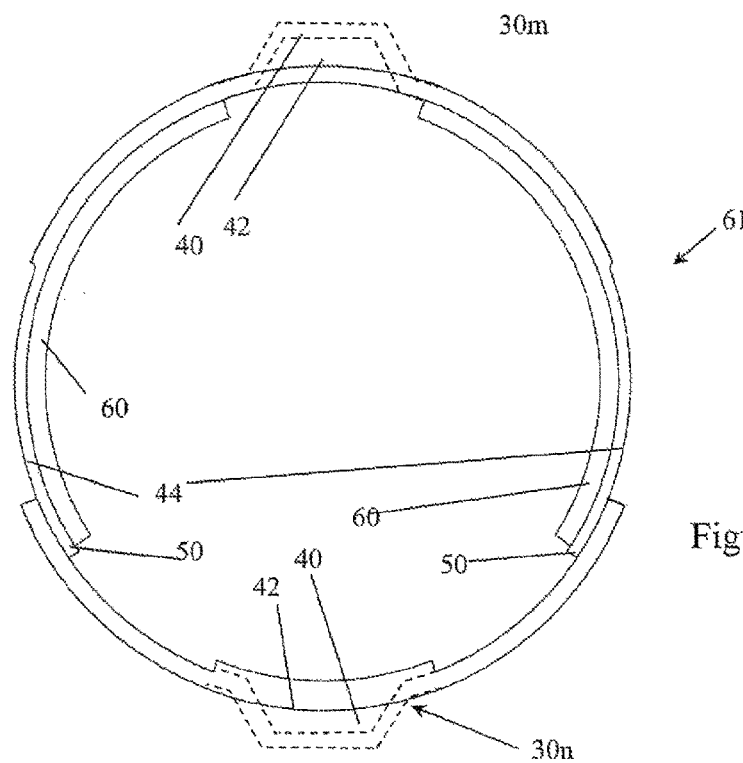
FIG. 24 a cross section through an assembled connection device where the upper and lower shell members are not identical the upper shell member has two skirts and the assembly is held together by a cylindrical or circumferential clamp.

FIG. 24 shows a device 610 which is similar in operation to the embodiment of FIG. 18 and FIG. 23, in that the shell members 30m and 30n are not identical, and two skirts extend from the shell 30m and the shell members are secured by a pipe clamp similar to that of clamp 778 of FIG. 23. It will be noted that a total of four friction pads 60 are utilised all attached to the upper shell 30m.

Illustrated in FIG. 25 is an example of a cordless drill with torque ring control wherein the big end or small end of the device 10 can be attached to the torque ring. Whereas FIG. 26 is illustrated a chuck of larger diameter than the neck of a drill wherein the small end of the device 10 can engage the neck and the tapered section accommodates the larger diameter chuck.

The drive assembly 70 as described above is preferably constructed with bearings which are sealed and require no lubrication during their service life.

Illustrated in FIGS. 28 and 29 is a schematic illustration of a connector tool manufactured from a single shell member 30S, which is a single scroll of wound sheet material or extruded or moulded material, which will allow the connection of one tool to another in the manner described above.

The shell 30S can be secured to the neck of a drill at one end of the shell 30S by means of a circumferential clamp like a hose clamp, or radial flanges like flanges 35 of previous drawings can be provided, whether integrally moulded on shell 30S or pop riveted or other joining means used. The other end of the shell 30S can be secured to the body of another tool such as a cutting tool as described above.

Illustrated in FIGS. 30 and 31 is a schematic illustration of another connector tool manufactured from a single shell member 30T, which will allow the connection of one tool to another in the manner described above. The shell 30T differs from the shell 30S in that two full length flanges 35T are provided along the length of the shell 30T at the opposed edges of the shell 30T. The flanges 35T can used to receive securing screws as described above, or alternatively it can be secured to the neck of a drill (or similar) at one end of the shell 30T by means of a circumferential clamp like a hose clamp. The other end of the shell 30T can be secured to the body of another tool such as a cutting tool as described above.

Also illustrated in FIG. 31 is a shield or skirt 44T, which at one side can be connected to the shell 30T by adhesive or pop rivet or the like so as to perform a similar function to the skirt 44 of the figures described above. Alternatively the shield or skirt 44T can unconnected to the shell 30T, and will be held in place when the ends of the shell 30T are secured to the respective tools.

Illustrated in FIG. 32 is another connector tool which has a single piece shell 30W. The shell 30W has a cylindrical centre 30W.1, and bifurcated ends 30W.2, which as can be seen from FIG. 32 the upper and lower portions each have their own flanges 35w so that securing screws can pass there through so as to move the upper and lower portions together to clamp to a cutting tool and or neck of a drill. Such a shell 30W is best suited to the situation where the shell 30W can be slid over the cutting tool. This may require several sizes of shell 30W to suit a range of drill neck diameters and cutting tool bodies, and while not a one size fits a range of neck and tool diameters as is the case of the previously described embodiments, the shell 30W will function to hold a drill and cutting tool together, for the cutting tool's operation.

The connection device or tool 1110 of FIGS. 34 to 40, is similar to the one piece shell devices 30S, 30T and 30W of FIGS. 28 to 30, in that the device 1110 is constructed from a single piece shell 30 which at the lower regions thereof, on opposite sides of the shell 30, are two opposed flanges 35. While the connection devices or tools of earlier embodiments were manufactured from polypropylene, the device or tool 10 is preferably manufactured from polycarbonate material, particularly due to its better strength properties.

Through the flanges 35 are apertures 36, through which a bolt 20 is assembled. The flanges 35 include a formation 35.1 (see FIG. 38) made up of three walls 35.11, 35.12 and 35.13, which will rest adjacent three sides of the bolt head 20.1. This will prevent the bolt head 20.1 from rotating, thus preventing the shank 20.2 of the bolt 20 from rotating thereby allowing the knurled cylindrical nut 22 to clamp the inner rim 30.3 of the device 1110, to the outer rim of body 90.2 of the cutting tool 90.

Figure 39:
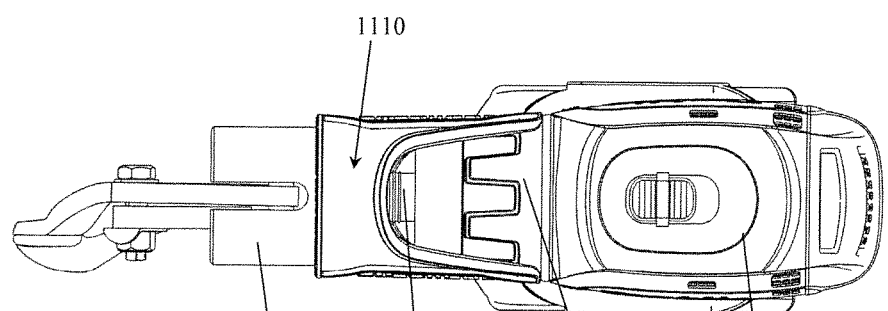
FIG. 39 illustrates a plan view of the apparatus of FIG. 34 as assembled to an impact driver.
Figure 40:
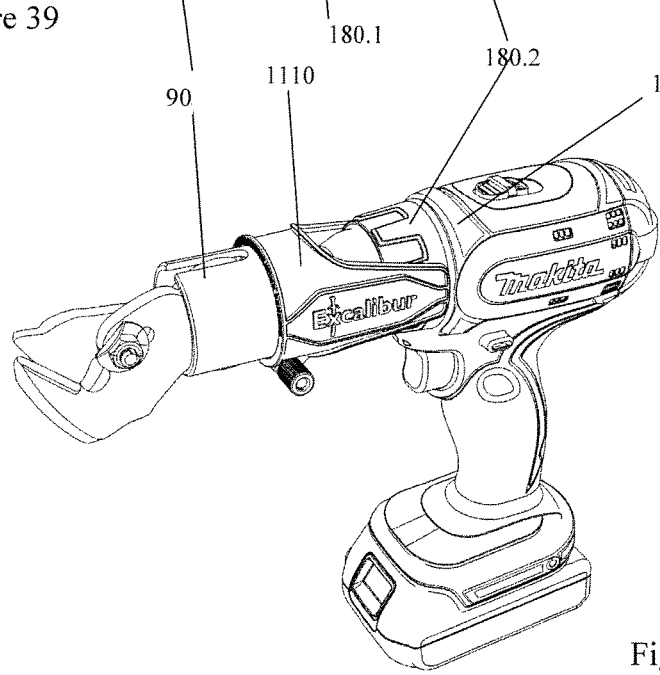
FIG. 40 illustrates a perspective view of the assembly of FIG. 38.

The inner rim 30.3 includes a left and right side inwardly and circumferentially extending flange 30.4 which provides a shoulder against which the rearmost rim 90.4 of the body 90.2 can abut, so as to control or determine the amount of rearward extension of the side wings 30.5 and 30.6 relative to body 90.2, once the drive assembly 70 has its hex shaft inserted into the hex drive socket 180.1 of an impact driver 180, as best seen in FIGS. 39 and 40.

The side wings 30.5 and 30.6 are constructed to provide outward radial resistance against movement in the directions of arrows 111 (see FIG. 34) by means of the curved shape of the wings 30.5 and 30.6 (best seen at the rear of wing 30.5 in FIGS. 35 and 36) as well as the flange 30.8 which extends along the free edges of the wings 30.5 and 30.6.

By the distance 30.9 (see FIG. 37) being of the order of 50 mm, when the flanges 35 are together, this ensures that the wings 30.5 and 30.6 will exert a compressive force onto the body of the impact driver 180, in the region 180.2, which is of the order of a minimum of 55 mm in diameter or width, as measured on current impact drivers available in the market place at the time of invention.

The length of the shank 20.2 of bolt 20 will allow the shell 30 to expand as necessary for different size bodies 90.2 of tool 90, while the balance of flexibility and rigidity of the wings 30.5 and 30.6 which result from their the constructional features, and being made from polycarbonate, ensures that the rear of the connection tool or device 1110 will suitably interact with a wide range of impact drivers on the market, depending upon their outer diameter.

The nature of the interaction of the wing 30.5 and 30.6 with the impact driver body, is such that the impact driver body shape or features thereon, will not allow the wing 30.5 and 30.6 to rotate too far, if at all, before it jams into place thus preventing the body 90.2 and tool 90 from rotating during operation. The device 1110 thus ensures that when combined with an impact driver, a single handed combined tool results, leaving the operator's hand free to secure or handle the piece being cut.

Impact drivers 180 generally include a hex-socket to receive the hex shaft 72.1. Such hex sockets include a captured spring biased ball which will move biasedly into the groove 72.2, thereby locking the cutting tool 90 to the impact driver 180. In the absence of the tool or device 1110, the bearing system in the drive assembly 70, will result in an operator needing to use two hands, which is eliminated when the tool or device 1110 is installed.

The flanges or shoulders 30.4 each subtend an arc of approximately 120° measured from the respective bolt flange 35. This ensures that the upper inner rim 30.33 does not have a flange 30.4 extending over it. By being constructed in this manner it ensures that the upper rim 30.33 of the shell 30 will have sufficient flexibility so that the flanges 35 can be moved apart so that the shell 30 can accommodate a range of diameters of body 90.2.

The bight between the wings 30.5 and 30.6 also provides the advantage of the operator being able to view that the hex socket 180.1 is rotating when driver 180 is activated.

If desired, like the preceding embodiments, the tool or device 1110 can include friction pads, like pads 60 of FIG. 1, to be mounted on the inner circumferential surfaces of wings 30.5 and 30.6, to assist in preventing or minimising relative rotation between the tool or device 1110 and the body of the driver 180. It will be seen in the connection device or tool 1110 that the nut 22 has a larger outer diameter on the outer knurled end 22.1 as compared to the inner end 22.2. This will ensure that the inner end 22.2 does not engage the bolt head engaging surfaces 35.11, 35.12 and 35.13, while the operator is tightening the nut 22.

By both flanges 35 having formation 35.1, the operator is able to insert the bolt 20 from either direction, for left or right handed operation. It will be noted that the tool or device 1110 does not extend over the oscillating arm 90.1 like the previous embodiments. If desired, the shell 30 can be made longer, in which case, it will be better for the flanges 35 to be on the side of the device or tool 1110, and that an upper and lower channel portion 40 can be provided on the shell 30 of FIG. 36 so that the oscillating arm 90.1 has a space in which to enter, so that tool or device 1110 will not disrupt the operation of tool 90.

Illustrated in FIGS. 41 and 42 is a connection device or tool 2110 similar to that of FIGS. 34 to 40, except that two shells 30 are utilised. Further as two half shells 30 are utilised, the upper side of the shells 30 includes upper attachment flanges 35 so that an upper bolt 20 and nut 22 can interact with the upper flanges 35 so as to clamp the forward end to a cutting tool body 90.2.

The inner rim of each shell 30 includes a coextensively circumferentially extending and inwardly projecting flange 30.4, as to locate the shells 30, relative to the rearward most rim (90.4) of a body 90.2 of a cutter 90.

The wings 30.5 and 30.6 extend rearwardly and are constructed in, and function in, the same manner as in the embodiments of FIGS. 34 to 40, so as to engage a drilling tool such as an impact driver.

The shells 30 of FIGS. 41 and 42 can be identical, whereby the branding (in this case "Excalibur") on one side will be right way up, but on other side upside down. Alternatively the shells 30 can be made in different moulds so that the branding is right-side up on both sides.

In FIG. 43, the connection device or tool 3110 is also made up of two shells 30, but a second upper edge flange 35 is provided on the rear side of a plane 30.41 which includes the flanges 30.4. The second upper edge flange 35 on each shell 30 allows a third bolt 20 and third nut 22 to be used, by which extra force and or pressure can be applied to and transmitted from the forward ends of wings 30.5 and 30.6 to the rearward ends of the wings 30.5 and 30.6, thereby applying greater pressure or force to the driving tool or impact driver than the embodiment of FIGS. 34 to 40.

Whereas in FIG. 44 the connection tool or device 4110 has a third set of flanges 35 and third bolt 20 and third nut 22 are located closer to the rearward ends of the wings 30.5 and 30.6 to achieve a similar result. It will be noted that in this embodiment the third flanges/bolt/nut 35/20/22 are located further way from the plane 30.41 than in FIG. 43 where they are at the forward end of said wings 30.5 and 30.6.

From the embodiments described above it will be identified that there is provided a connection tool or device 10,110,210,310,410,510,610,1110,2110,3110,4110 to connect a first tool (90 or (80 or 180)), to a second tool ((80 or 180) or 90 respectively), the connection tool or device 10,110,210,310,410,510,610,1110,2110,3110,4110 comprising at least one first shell member (30 from FIG. 1, 30A, 30B, 30C, 30G, 30N. 30S, 30T, 30W, 30 of FIG. 35, 30 of FIGS. 41 to 44) which has at least a first end which is securable and moveable so as to clamp the first end of the at least one first shell member (30 from FIG. 1, 30A, 30B, 30C, 30G, 30N, 30S, 30T, 30W, 30 of FIG. 35, 30 of FIGS. 41 to 44) to the first tool (90 or (80 or 180)) and a second end of the at least one first shell member (90 or (80 or 180)) being adapted to interact or cooperate with the second tool ((80 or 180) or 90). The second end can interact or cooperate with the second tool ((80 or 180) or 90) by rotation therebetween being prevented. The rotation can be prevented by the second end engaging a portion of the second tool((80 or 180) or 90). The rotation can be prevented by the second end being clamped to a portion of the second tool ((80 or 180) or 90).

The connection device or tool can have at least a first and or a second shell members utilised one of which is securable and or can have ends moveable towards each other so as to: clamp a first end of the shell members to the first tool and to clamp a second end of the shell members to the second tool; or clamp a first end of one of the shell members to the first tool whereby the second end of said shell members will prevent rotation between said second end and said second tool.

The embodiments of FIGS. 1 to 12 and 18 to 32, or the embodiments of FIGS. 34 to 44 also provide a connection device to tool whereby once assembled, the shell or pairs of shells assist to prevent the axial separation of the cutting tool 90 from the drill, driver, impact driver or the like. In the case of the embodiment of FIGS. 1 to 12 and 18 to 32, this is achieved in the connection tools or devices 10, 110, 210, 310, 410, 510, 610, 30S, 30T and 30W by the axial strength of the tool or devices or shells, as both ends are clamped to the respective cutting tool and driving tool. Whereas the devices or tools 1110, 21110, 3110 and 4110 of FIGS. 34 to 44 have one end clamped to the cutting tool while free wings at the other end will engage with some compressive force to the impact driver or drill body. This compressive force can provide a source of friction to assist in preventing the axial separation of the cutting tool and the impact driver or drill. This friction force can be increased, as described above, by the addition of friction pads, like the earlier embodiment, or by a second or third screw which can assist in providing a greater compressive force at the free wings than would otherwise be achieved. Thus by both prevention of relative rotation between the cutting tool and the impact driver or drill, and the prevention of axial separation of the cutting tool and the impact driver or drill, the above described devices assist to make the assembled components a single handed device for cutting, with ready disassembly where required.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A connection tool or device for connecting a first tool to a second tool, said connection tool or device comprising:
a first shell member and a second shell member which each has at least a first end, said at least first ends being securable and or including portions moveable with respect to each other, so as to clamp said first ends of said first shell member and said second shell member to said first tool,
and wherein said first shell member and said second shell member each has a second end, said second ends being adapted to interact or cooperate with said second tool,
wherein said connection tool or device includes at least one first skirt member extending from said first shell member, wherein said at least one first skirt member is clamped between said second shell member and one of said first and second tools when said connection tool or device is assembled and clamped to said first and second tools.

2. A connection tool or device as claimed in claim 1 wherein said at least one first skirt member extending from said first shell member underlies and or overlies part of said second shell member.

3. A connection tool or device as claimed in claim 1, wherein said at least one first skirt member extends along all of, or parts of, or part of, the length of said first shell member.

4. A connection tool or device as claimed in claim 1 wherein there is further included a friction generating material on an inner surface of at least one of said shell members or said at least one first skirt member so as to increase the friction developed with said first tool and or said second tool when said connection tool or device is assembled or clamped to said first tool and or said second tool.

5. A connection tool or device as claimed in claim 1 wherein said shell members have one or more than one of the following features:
a generally half cylindrical construction;
have at least one flange located on an outer periphery thereof;
are generally half cylindrical and each said first end has a first diametrical measurement while each said second end has a different diametrical measurement;
a substantial portion of an axial length of each said shell member has said first diametrical measurement; and
between said first and second ends is a tapering or conical portion.

6. The connection tool or device as claimed in claim 5, further comprising screws which clamp said shell members together and onto said first tool and or said second tool.

7. A connection tool or device as claimed in claim 1 wherein said first and second shell members are identical in construction.

8. A connection tool or device as claimed in claim 1, wherein said at least one first skirt member is or has one of the following:
is associated with said first or second shell member;
is attached to one side of said first or second shell member;
or
has a central cylindrical portion having at each end thereof sides which are able to move towards each other so as to clamp said first tool and or said second tool.

9. A connection tool or device for connecting a first tool to a second tool, said connection tool or device comprising:
a first shell member and a second shell member which each has at least a first end, said at least first ends being securable and or including portions moveable with respect to each other, so as to clamp said first ends of said first shell member and said second shell member to said first tool,
and wherein said first shell member and said second shell member each has a second end, said second ends being adapted to interact or cooperate with said second tool;

wherein said second shell member includes at least one skirt member extending from said second shell member, so that said at least one skirt member is clamped between said first shell member and one of said first and second tools when said connection tool or device is assembled and clamped to said first and second tools.

10. A connection tool or device as claimed in claim 9, wherein there is further included a friction generating material on an inner surface of at least one of said shell members or said at least one skirt member so as to increase the friction developed with said first tool and or said second tool when said connection tool or device is assembled or clamped to said first tool and or said second tool.

11. A connection tool or device as claimed in claim 9, wherein said shell members have one or more than one of the following features:
 a generally half cylindrical construction;
 have at least one flange located on an outer periphery thereof by which securing screws clamp said shell members together onto said first tool and or said second tool;
 are generally half cylindrical and each said first end has a first diametrical measurement while each said second end has a different diametrical measurement;
 a substantial portion of an axial length of each said shell member has said first diametrical measurement; and
 between said first and second ends is a tapering or conical portion.

12. A connection tool or device as claimed in claim 9 wherein said first and second shell members are identical in construction.

13. A connection tool or device as claimed in claim 9, wherein said at least one skirt member is or has one of the following:
 is associated with said first or second shell member;
 is attached to one side of said first or second shell member; or
 has a central cylindrical portion and at each end thereof, sides which are able to move towards each other so as to clamp said first tool and or said second tool.

14. A connection tool or device for connecting a first tool to a second tool, said connection tool or device comprising:
 a first shell member and a second shell member which each has at least a first end, said at least first ends being securable and or including portions moveable with respect to each other, so as to clamp said first ends of said first shell member and said second shell member to said first tool, and wherein said first shell member and said second shell member each has a second end, said second ends being adapted to interact or cooperate with said second tool;
 wherein said connection tool or device includes at least one first skirt member extending from said first shell member;
 wherein said connection tool or device includes at least one second skirt member extending from said second shell member;
 wherein said first and or second skirt member acts as a shield by closing off, or partially closing off, a space between said first and second shell members.

15. A connection tool or device as claimed in claim 14, wherein there is further included a friction generating material on an inner surface of at least one of said shell members or said skirt members so as to increase the friction developed with said first tool and or said second tool when said connection tool or device is assembled or clamped to said first tool and or said second tool.

16. A connection tool or device as claimed in claim 14, wherein said shell members have one or more than one of the following features:
 a generally half cylindrical construction;
 at least one flange located on an outer periphery thereof by which securing screws clamp said shell members together onto said first tool and or said second tool;
 are generally half cylindrical and each said first end has a first diametrical measurement while each said second end has a different diametrical measurement;
 a substantial portion of an axial length of each said shell member has said first diametrical measurement; and
 between said first and second ends is a tapering or conical portion.

17. A connection tool or device as claimed in claim 14 wherein said first and second shell members are identical in construction.

18. A connection tool or device as claimed in claim 14, wherein said at least one first and or second skirt member is or has one of the following:
 is associated with said first or second shell member;
 is attached to one side of said first or second shell member; or
 has a central cylindrical portion and at each end thereof, sides of which are able to move towards each other so as to clamp said first tool and or said second tool.

* * * * *